(12) United States Patent
Kim

(10) Patent No.: US 10,844,750 B2
(45) Date of Patent: Nov. 24, 2020

(54) METHOD OF DISASSEMBLING AND ASSEMBLING GAS TURBINE AND GAS TURBINE ASSEMBLED THEREBY

(71) Applicant: DOOSAN HEAVY INDUSTRIES & CONSTRUCTION CO., LTD., Changwon-si (KR)

(72) Inventor: Kyung Kook Kim, Daejeon (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 186 days.

(21) Appl. No.: 15/970,875

(22) Filed: May 4, 2018

(65) Prior Publication Data

US 2019/0003339 A1  Jan. 3, 2019

(30) Foreign Application Priority Data

Jun. 28, 2017 (KR) ......................... 10-2017-0081721

(51) Int. Cl.
 *F01D 25/28* (2006.01)
 *F01D 25/24* (2006.01)
 (Continued)

(52) U.S. Cl.
 CPC ......... *F01D 25/285* (2013.01); *F01D 25/243* (2013.01); *F01D 25/246* (2013.01);
 (Continued)

(58) Field of Classification Search
 CPC ... F01D 5/285; F05D 2230/60; F05D 2230/70
 See application file for complete search history.

(56) References Cited

U.S. PATENT DOCUMENTS

| 5,560,841 A | * | 10/1996 | DeMichael | ............ | B23K 11/22 |
|---|---|---|---|---|---|
| | | | | | 219/85.1 |
| 6,224,332 B1 | * | 5/2001 | Leach | ................... | F01D 25/243 |
| | | | | | 415/126 |

(Continued)

FOREIGN PATENT DOCUMENTS

| EP | 3159501 A1 * | 4/2017 | ............ F01D 25/30 |
|---|---|---|---|
| JP | 5398405 B2 | 1/2014 | |

(Continued)

*Primary Examiner* — Moshe Wilensky
*Assistant Examiner* — Christopher R Legendre
(74) *Attorney, Agent, or Firm* — Invenstone Patent, LLC

(57) ABSTRACT

A method of assembling and disassembling a gas turbine, and a gas turbine assembled thereby, improves work efficiency and reduces time and cost by carrying out various disassembly and reassembly processes depending on circumstances. In one process, a turbine section is disassembled from a gas turbine by sequential steps of disassembling an upper turbine case; disassembling a rear diffuser assembly and a rear bearing assembly; disassembling a combustor assembly; disassembling a vane assembly; and disassembling a blade assembly. In another process, first-stage to fourth-stage blade assemblies and first-stage to fourth-stage vane assemblies in a turbine section are disassembled from the gas turbine by sequential steps of disassembling an upper turbine case; disassembling a combustor assembly; disassembling a vane assembly; and disassembling a blade assembly. The gas turbine includes a compressor section, a combustor section, and the turbine section assembled in a reverse order with respect to the disassembly method.

11 Claims, 44 Drawing Sheets

100

(51) Int. Cl.
  *F01D 25/26* (2006.01)
  *F02C 7/28* (2006.01)
(52) U.S. Cl.
  CPC .............. *F01D 25/265* (2013.01); *F02C 7/28* (2013.01); *F05D 2230/60* (2013.01); *F05D 2230/64* (2013.01); *F05D 2230/70* (2013.01); *F05D 2240/55* (2013.01); *F05D 2250/283* (2013.01)

(56) References Cited

U.S. PATENT DOCUMENTS

| | | | | |
|---|---|---|---|---|
| 6,406,252 | B2* | 6/2002 | Kuhn | F01D 25/30 415/108 |
| 8,313,286 | B2* | 11/2012 | Beeck | F01D 5/143 415/119 |
| 8,636,890 | B2* | 1/2014 | Woodard | C25D 7/008 205/115 |
| 8,684,669 | B2* | 4/2014 | Chehab | F01D 11/122 415/118 |
| 2012/0156010 | A1* | 6/2012 | Morimoto | F01D 25/162 415/170.1 |
| 2014/0026999 | A1* | 1/2014 | Frailich | F01D 25/162 138/39 |
| 2017/0022843 | A1* | 1/2017 | Tanimura | F01D 9/02 |
| 2019/0003339 | A1* | 1/2019 | Kim | F01D 25/285 |
| 2019/0003381 | A1* | 1/2019 | Kim | F01D 5/06 |

FOREIGN PATENT DOCUMENTS

| | | | |
|---|---|---|---|
| JP | 5608701 | B2 | 10/2014 |
| JP | 6001854 | B2 | 10/2016 |

\* cited by examiner

[FIG. 1]
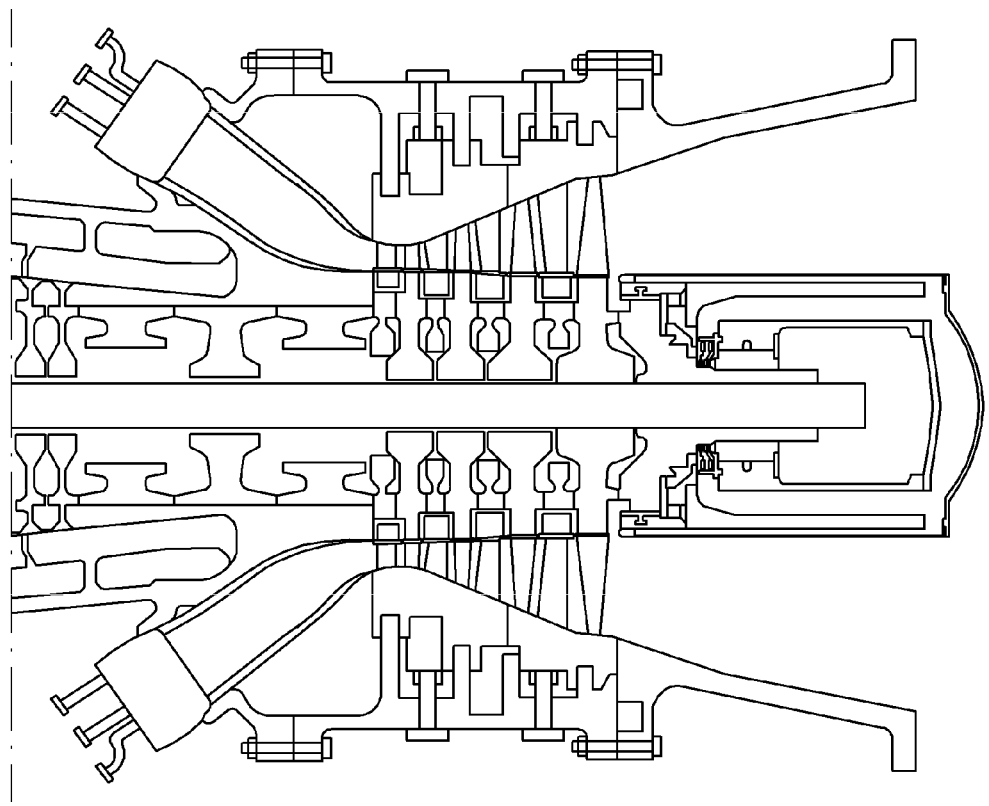

[FIG. 2]
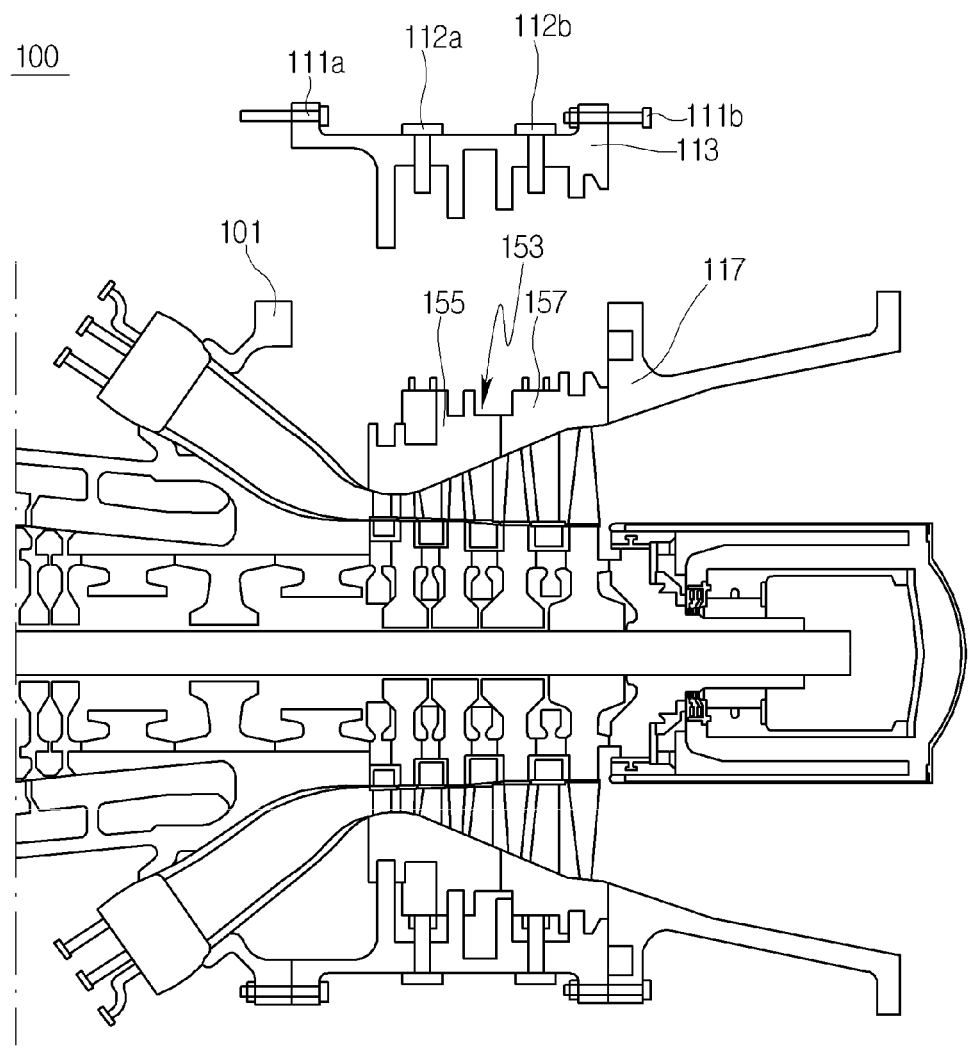

[FIG. 3]
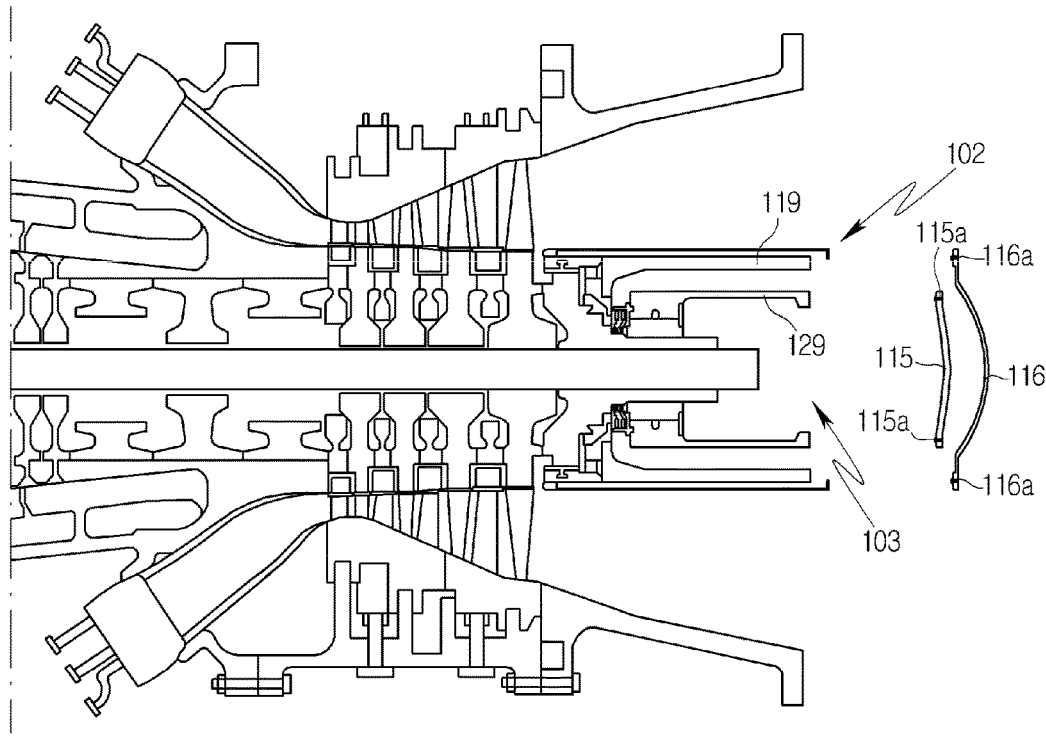

[FIG. 4]
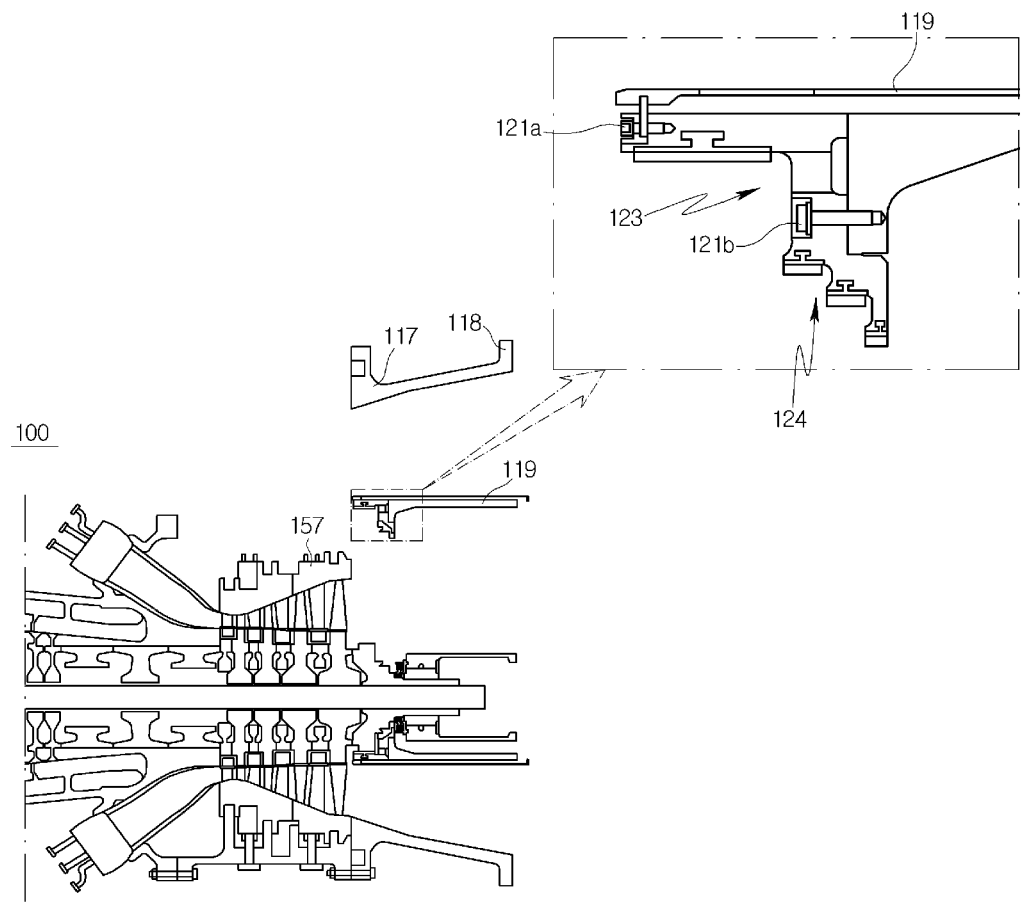

[FIG. 5]
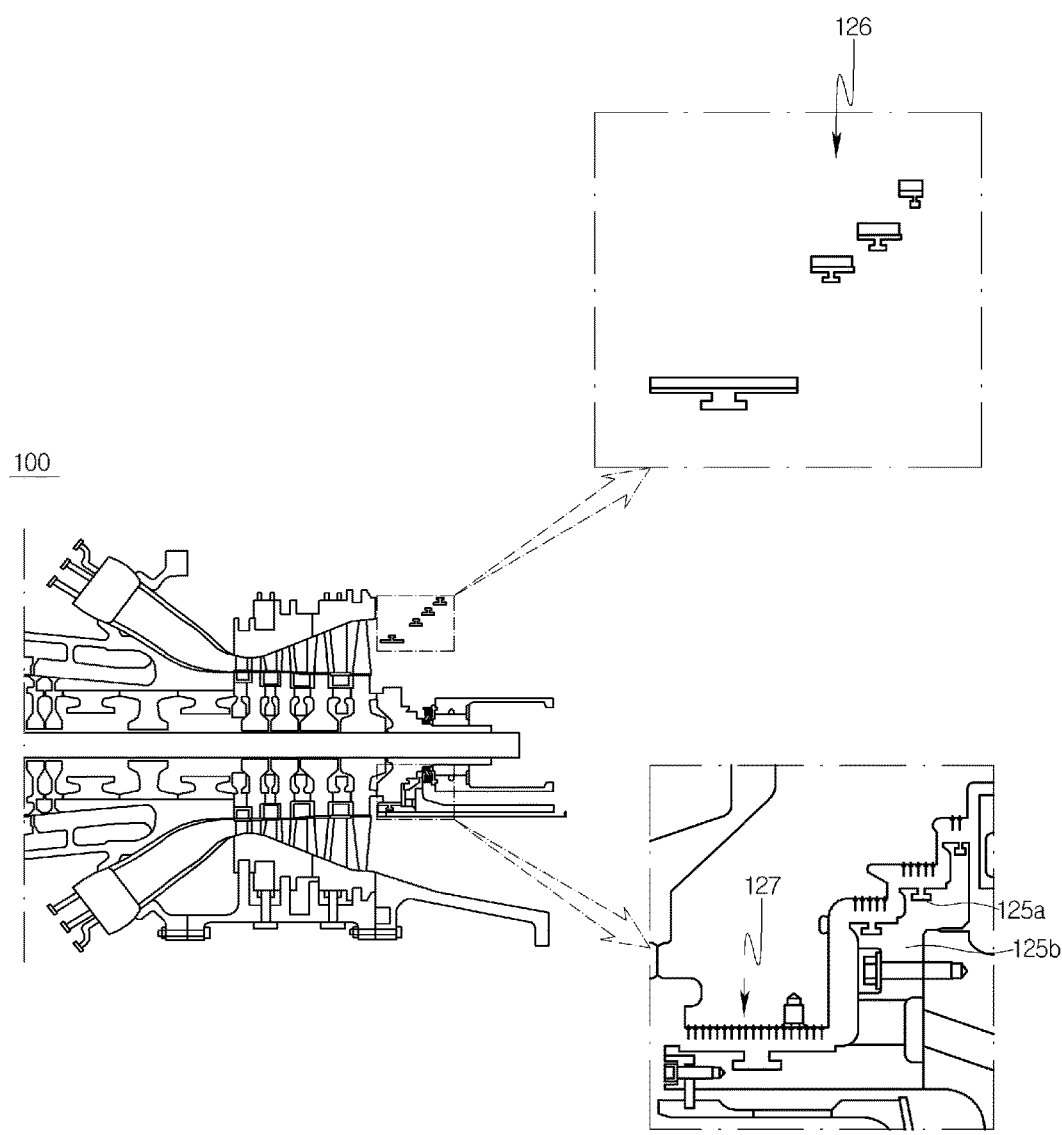

[FIG. 6]
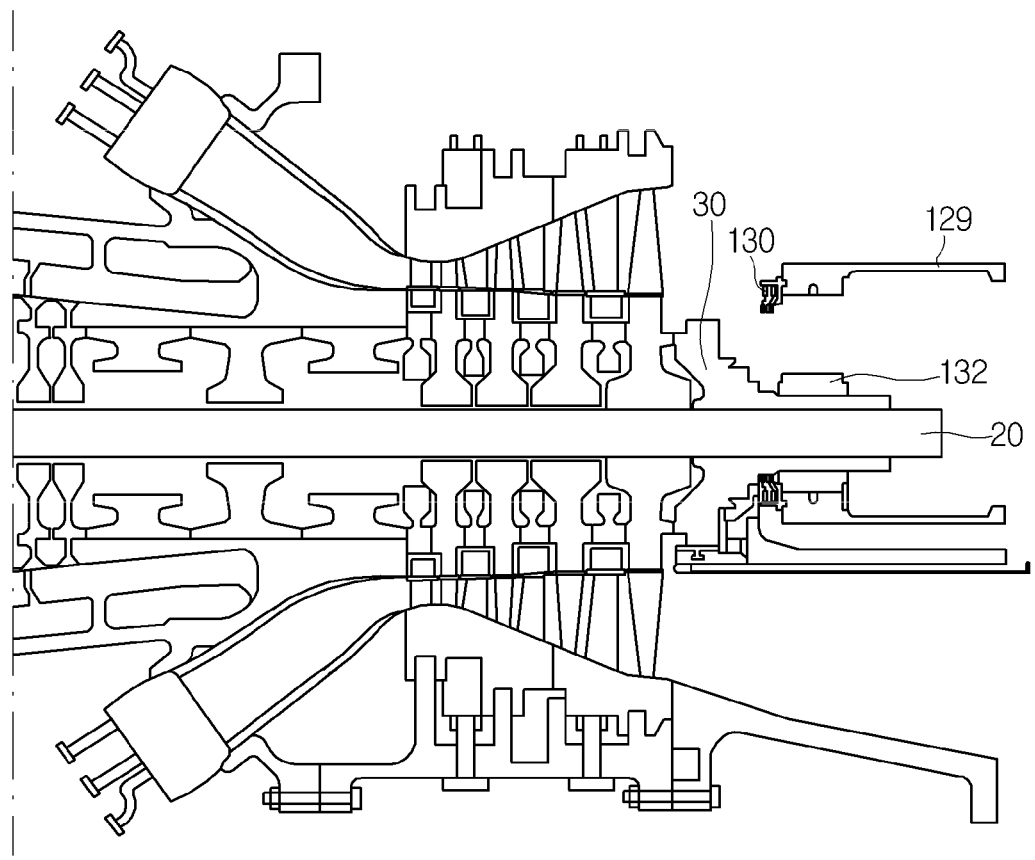

[FIG. 7]
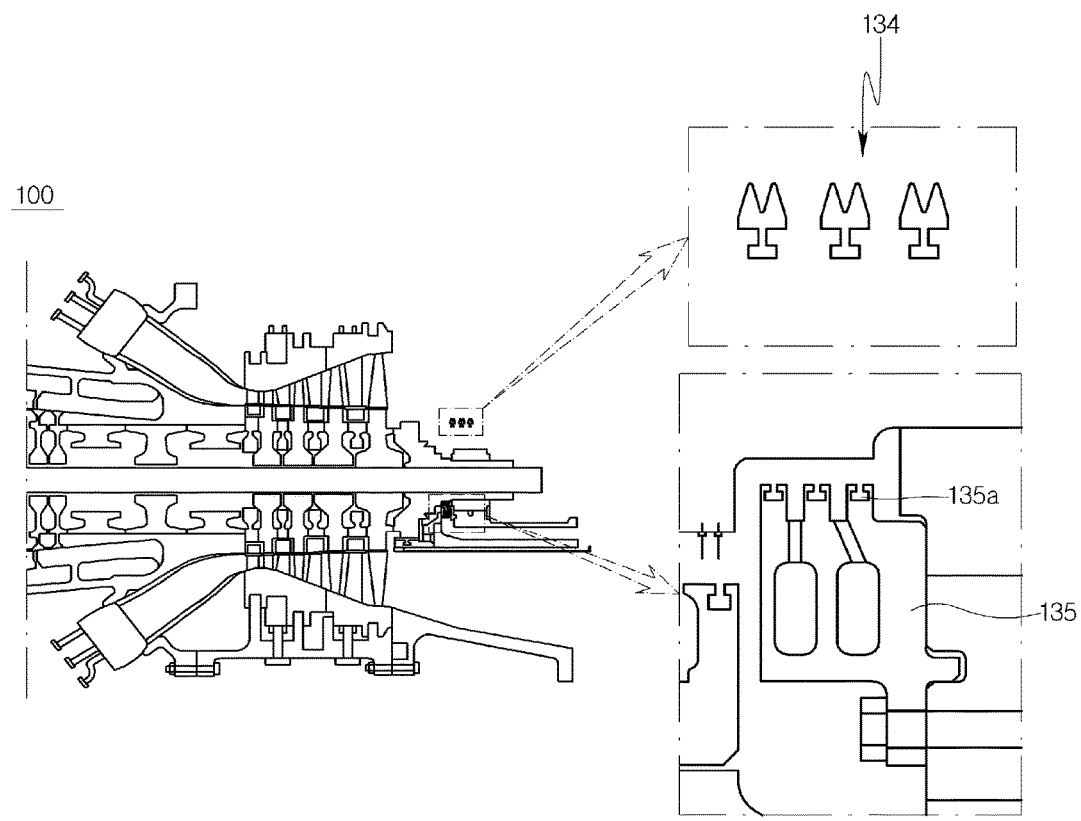

[FIG. 8]
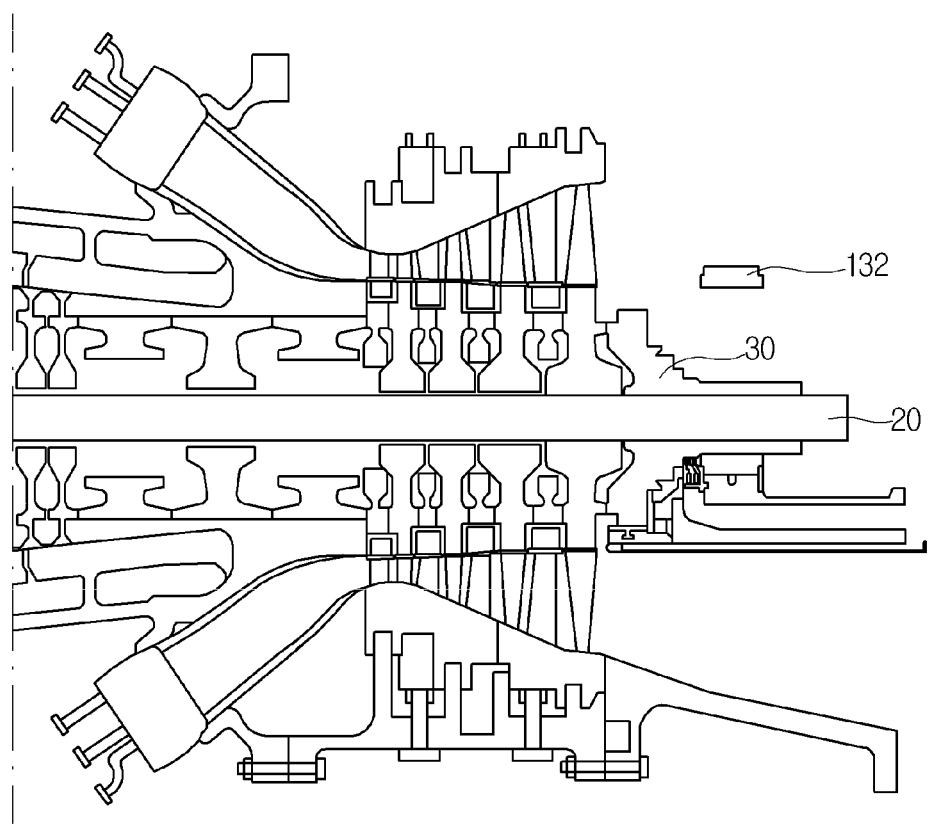

[FIG. 9]
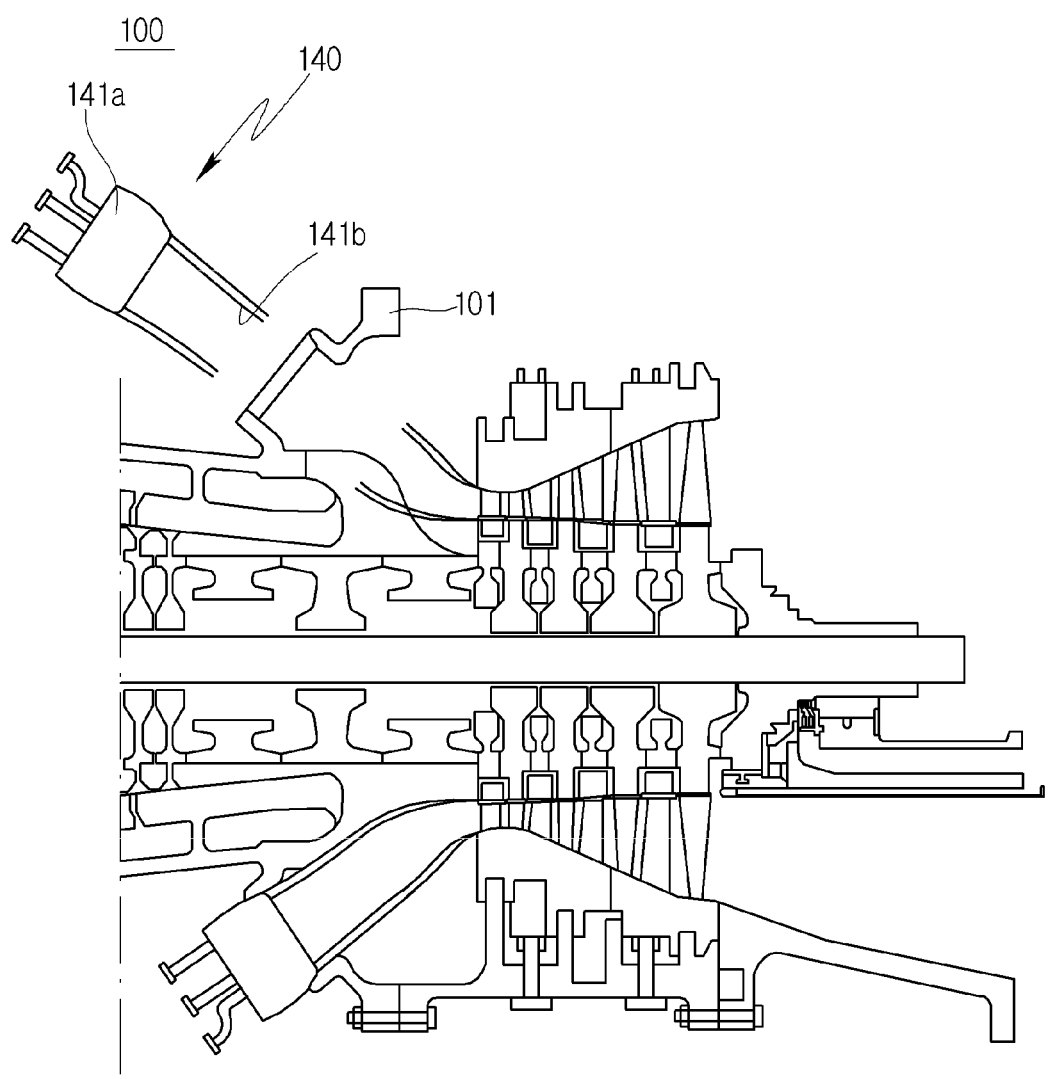

[FIG. 10]
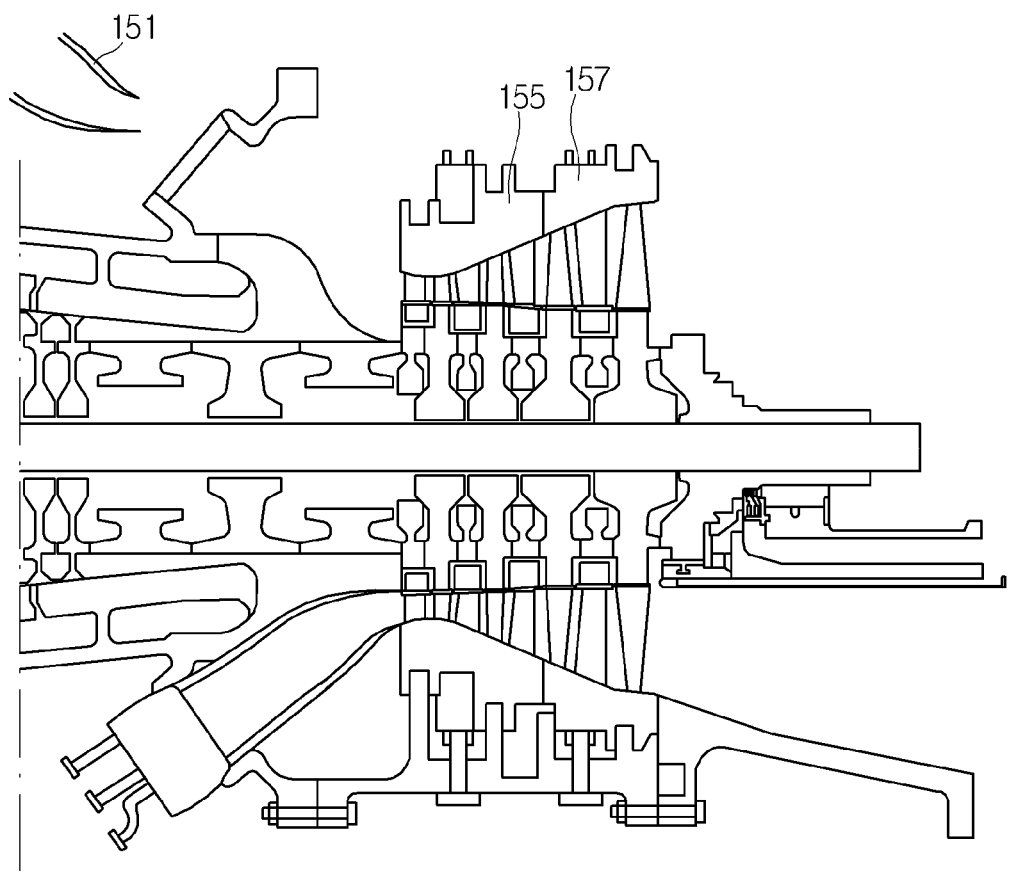

[FIG. 11]
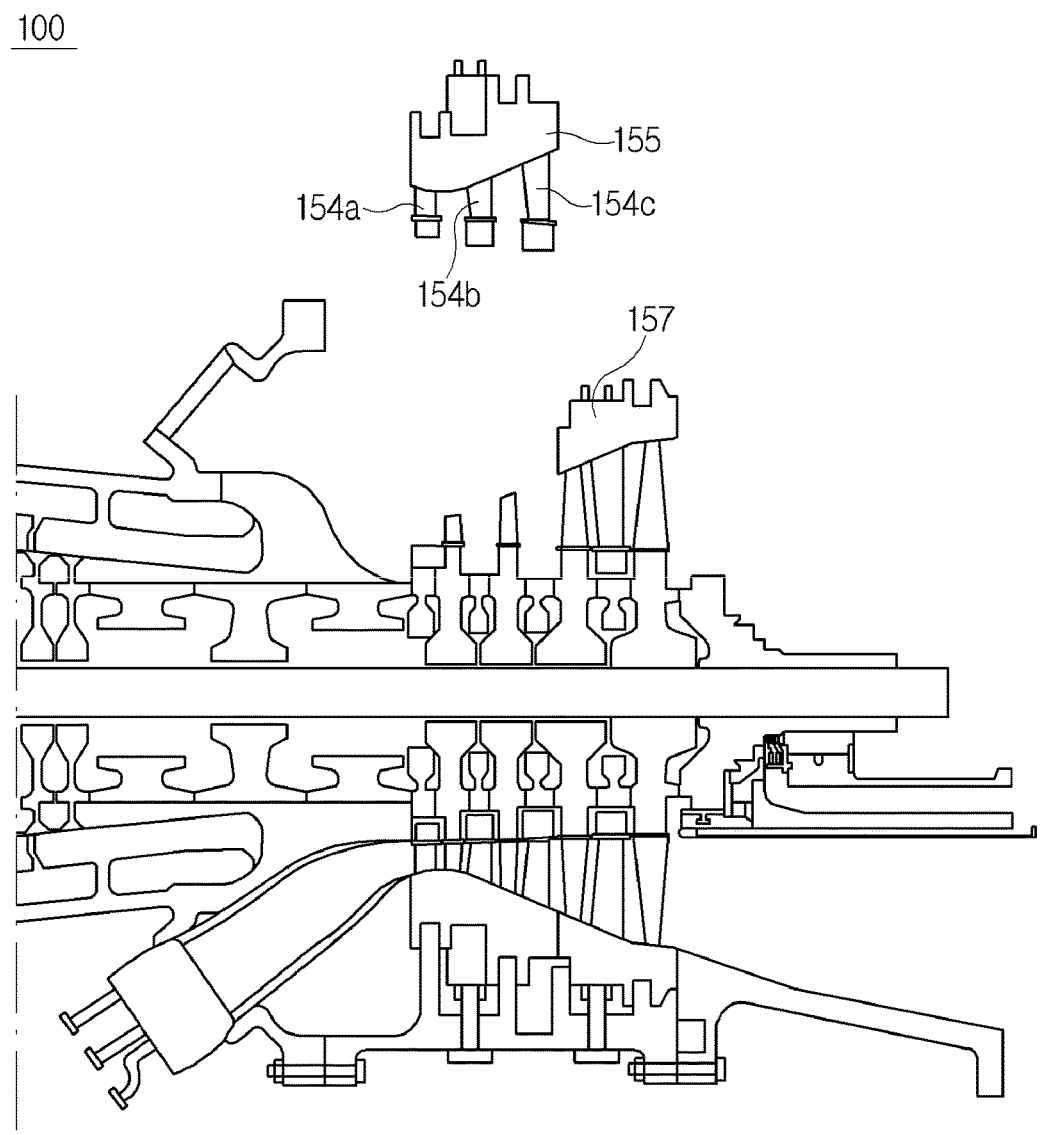

[FIG. 12]
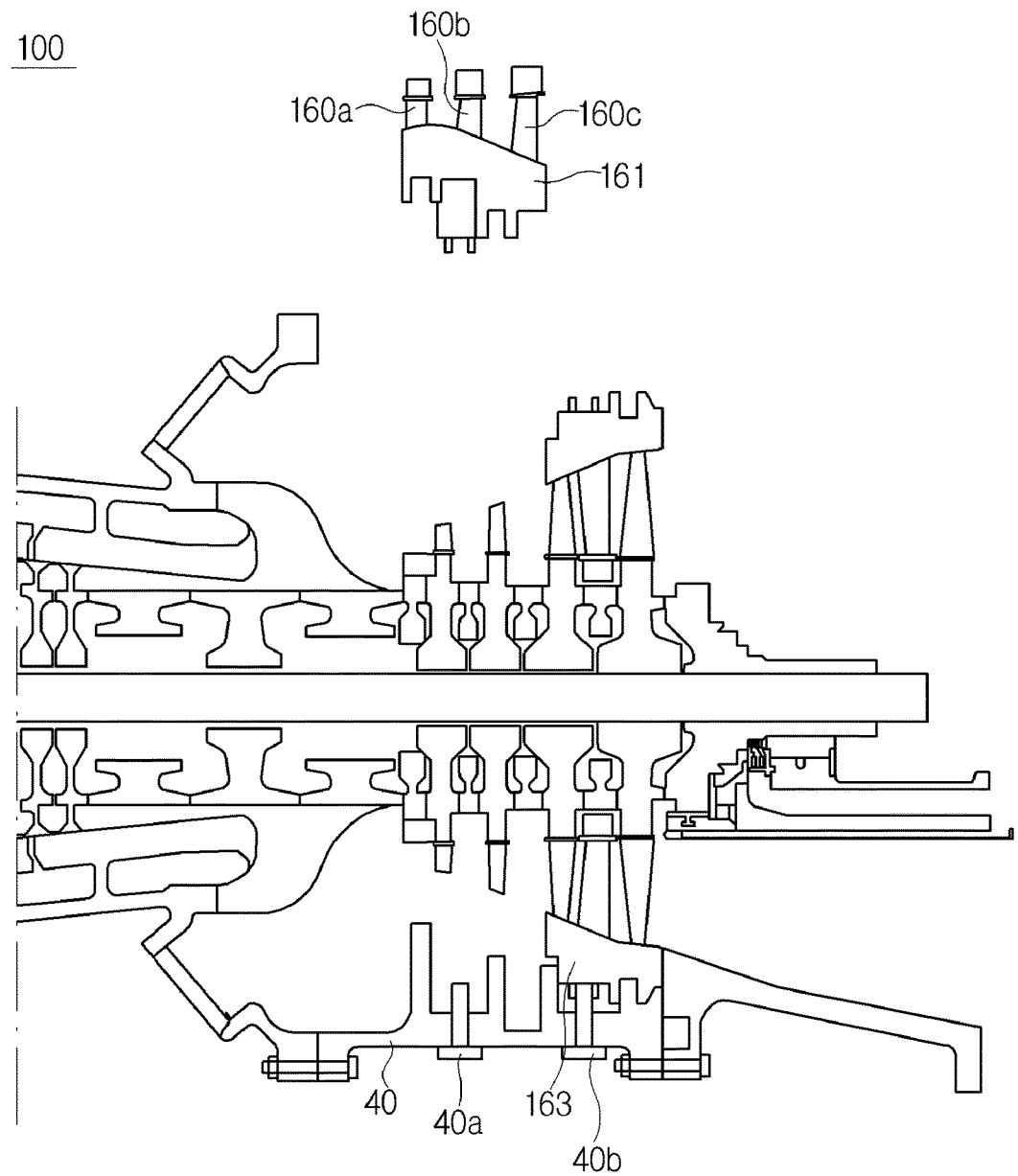

[FIG. 13]
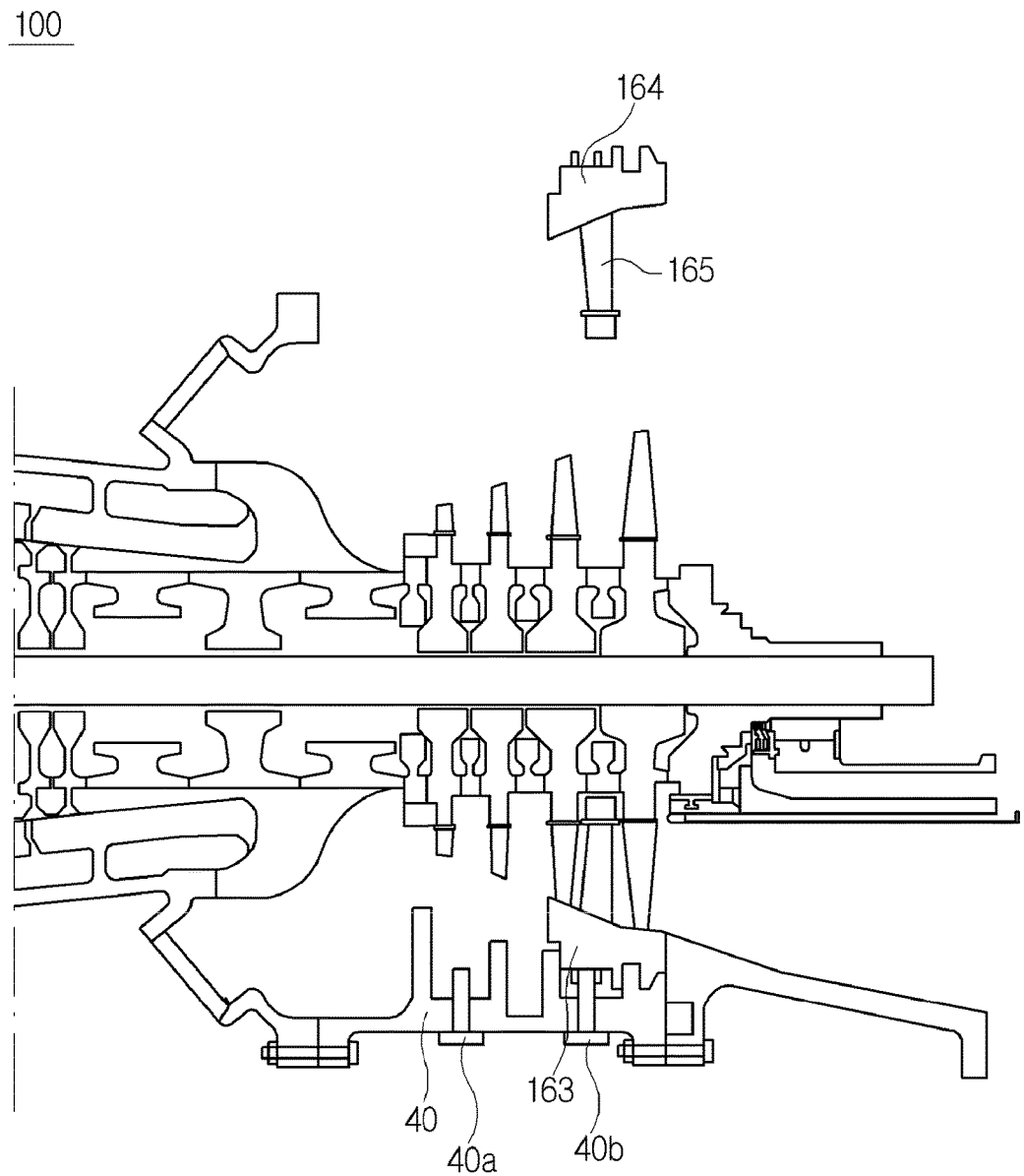

[FIG. 14]
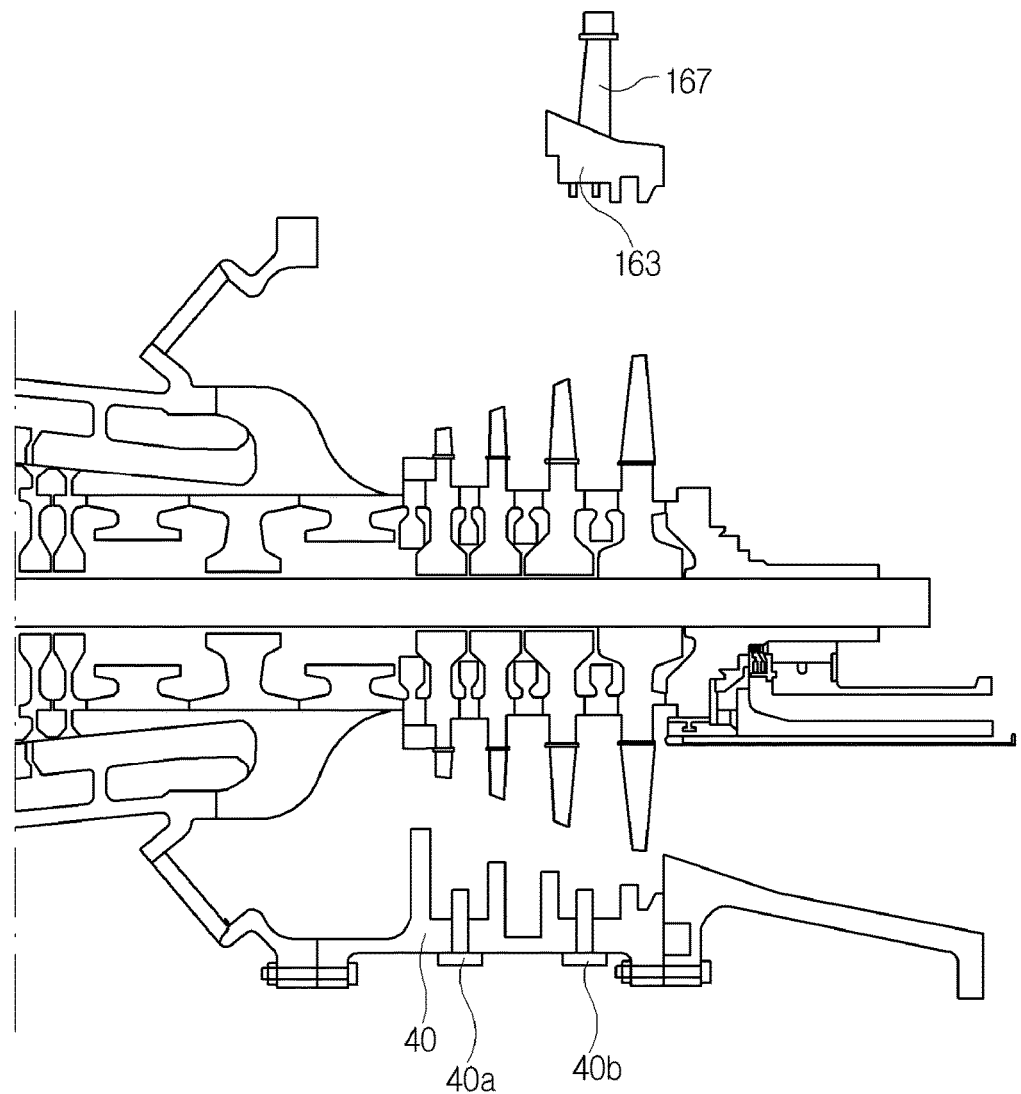

[FIG. 15]
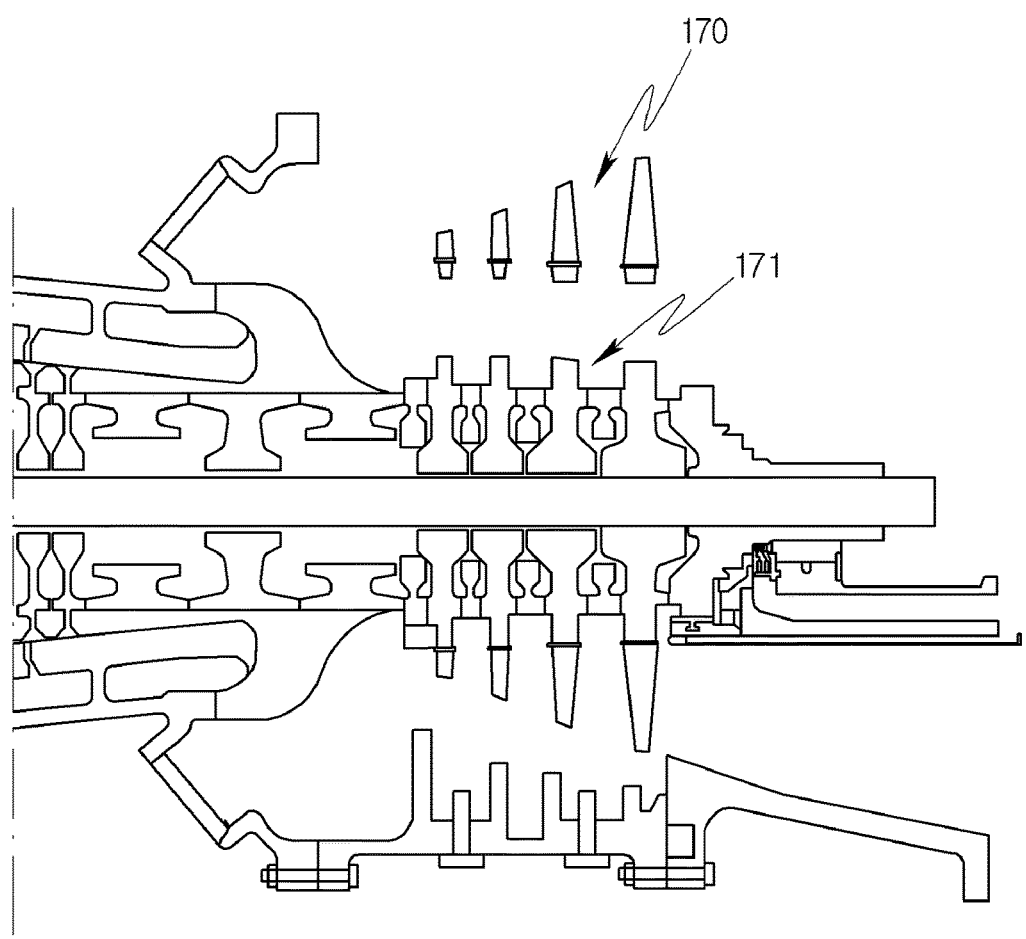

[FIG. 16]
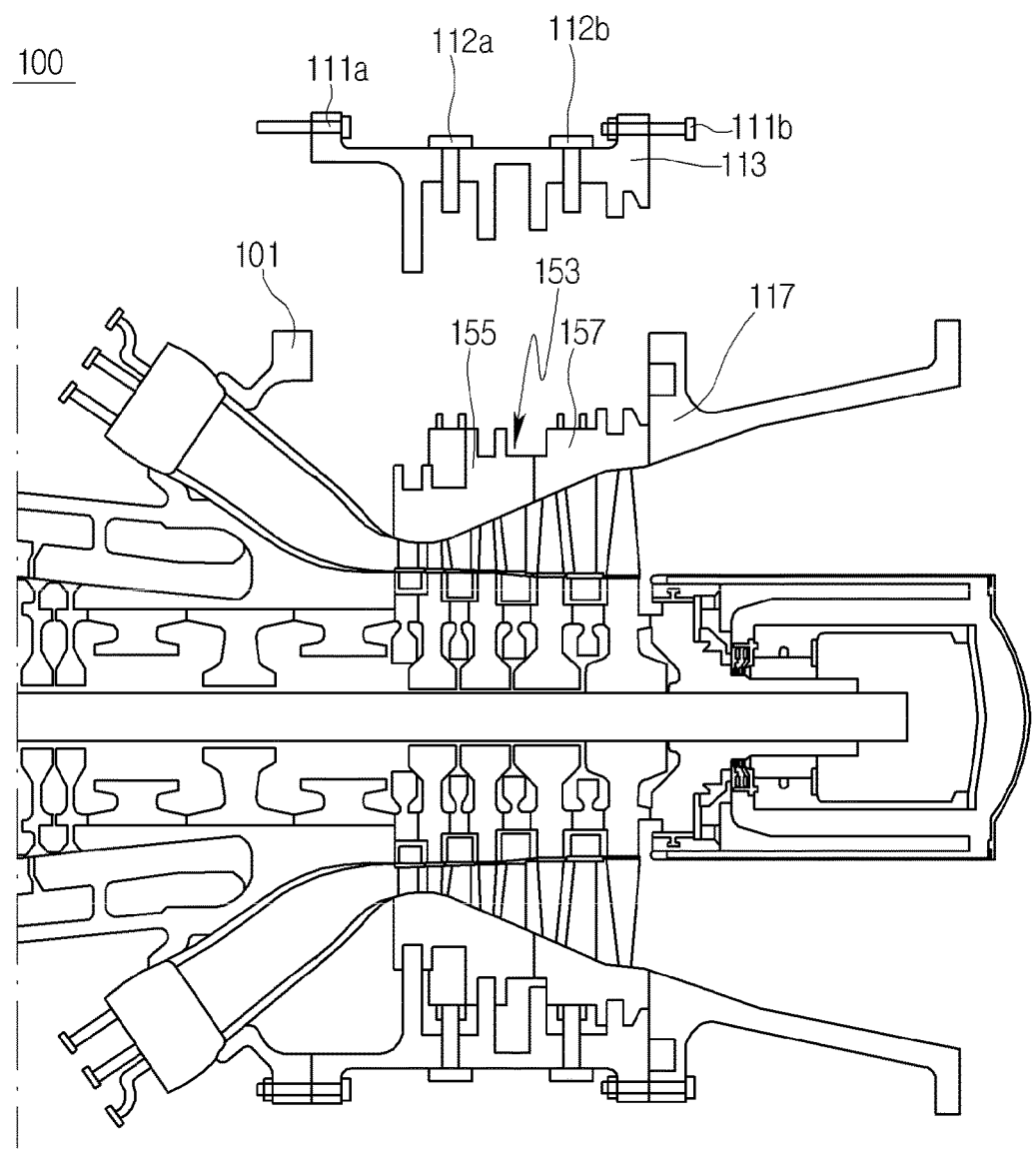

[FIG. 17]
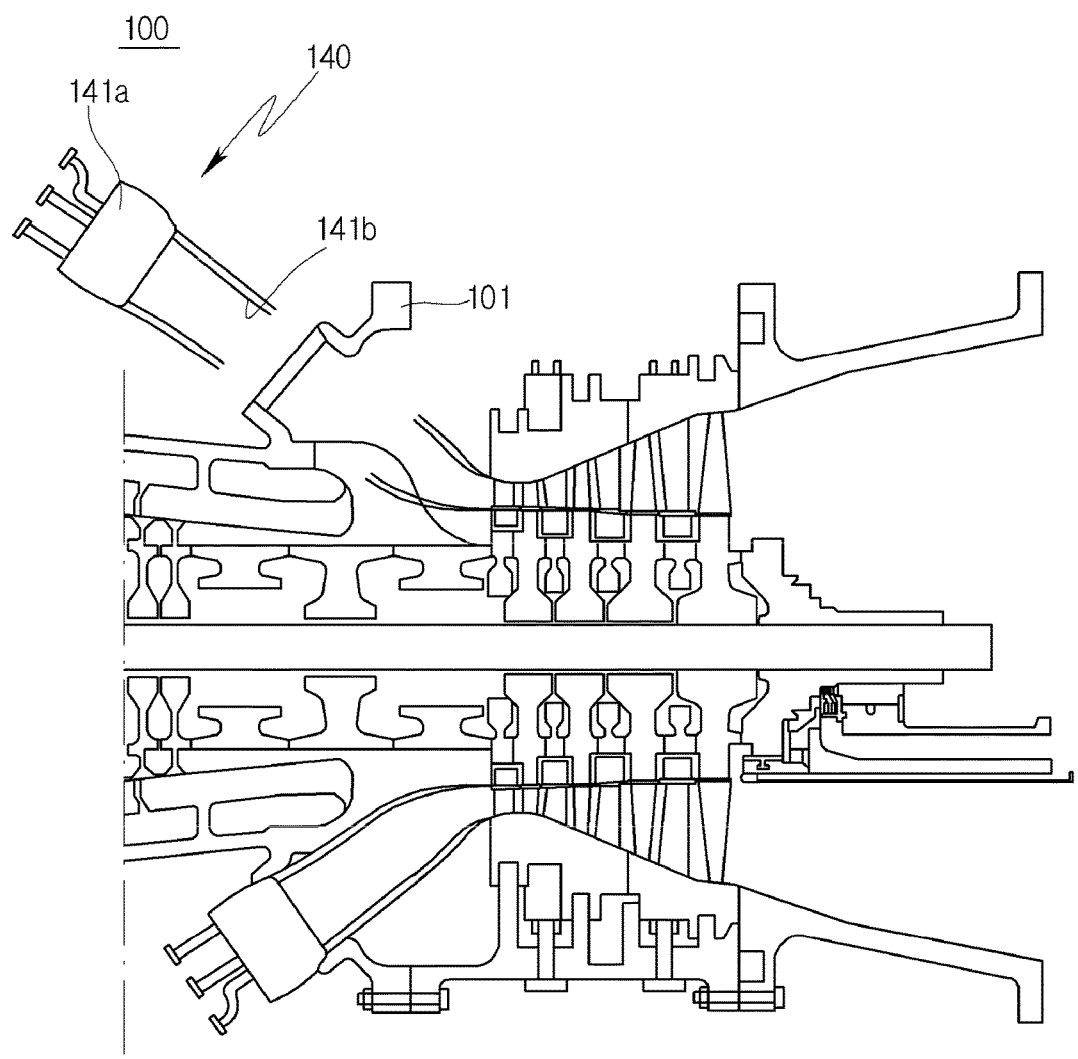

[FIG. 18]
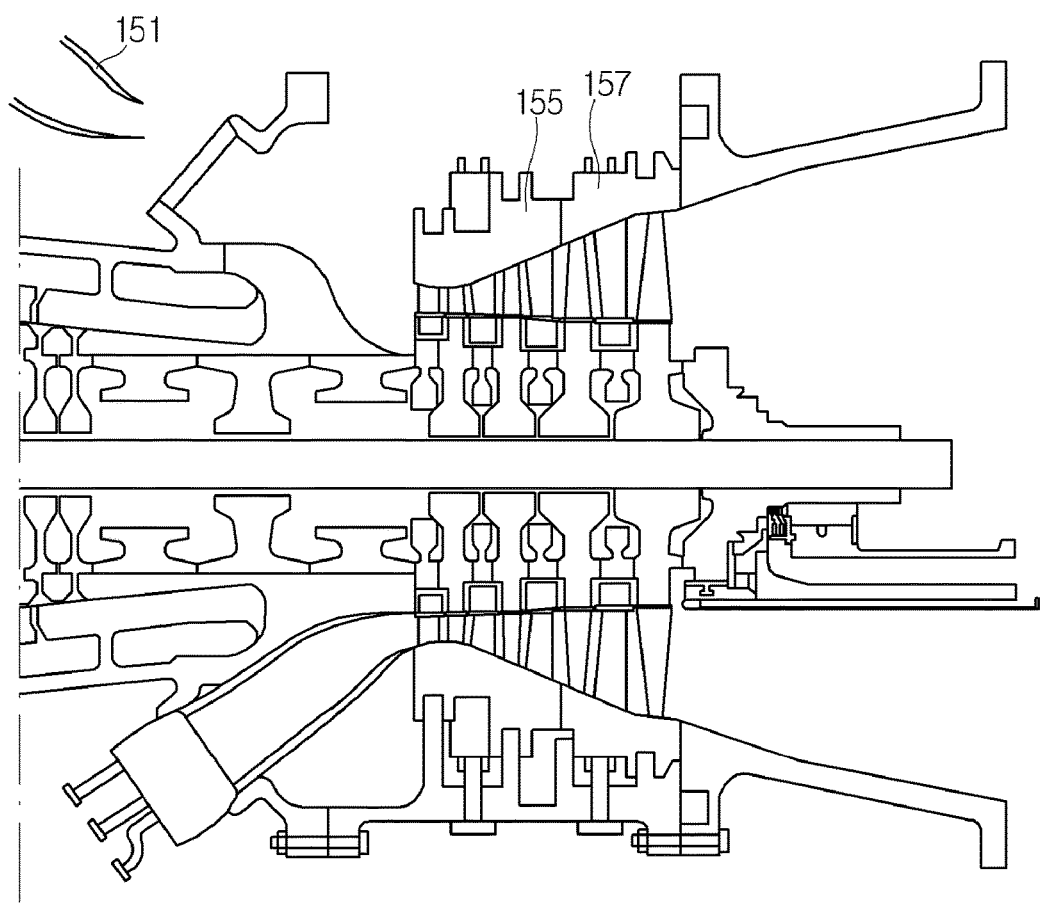

[FIG. 19]
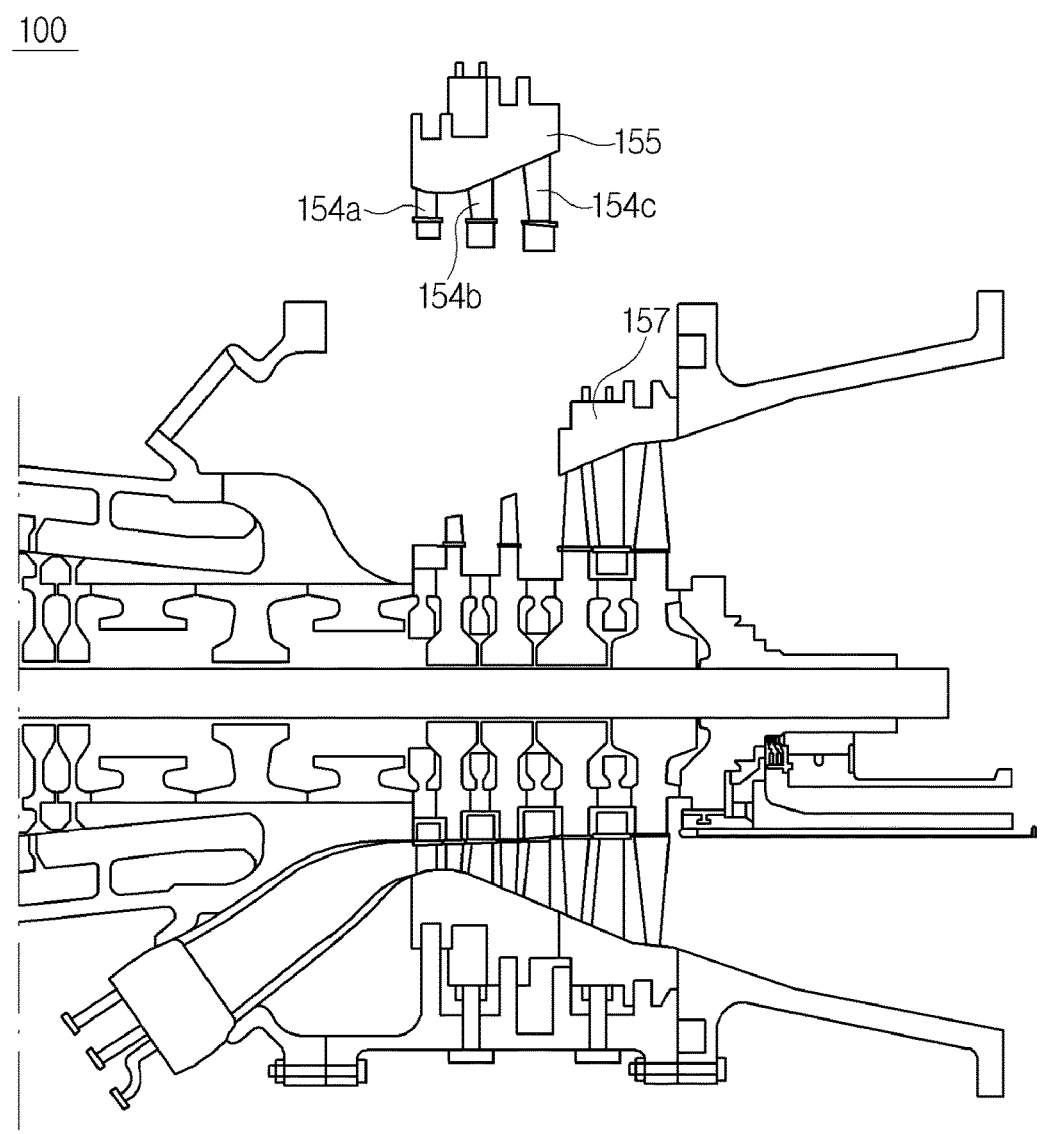

[FIG. 20]
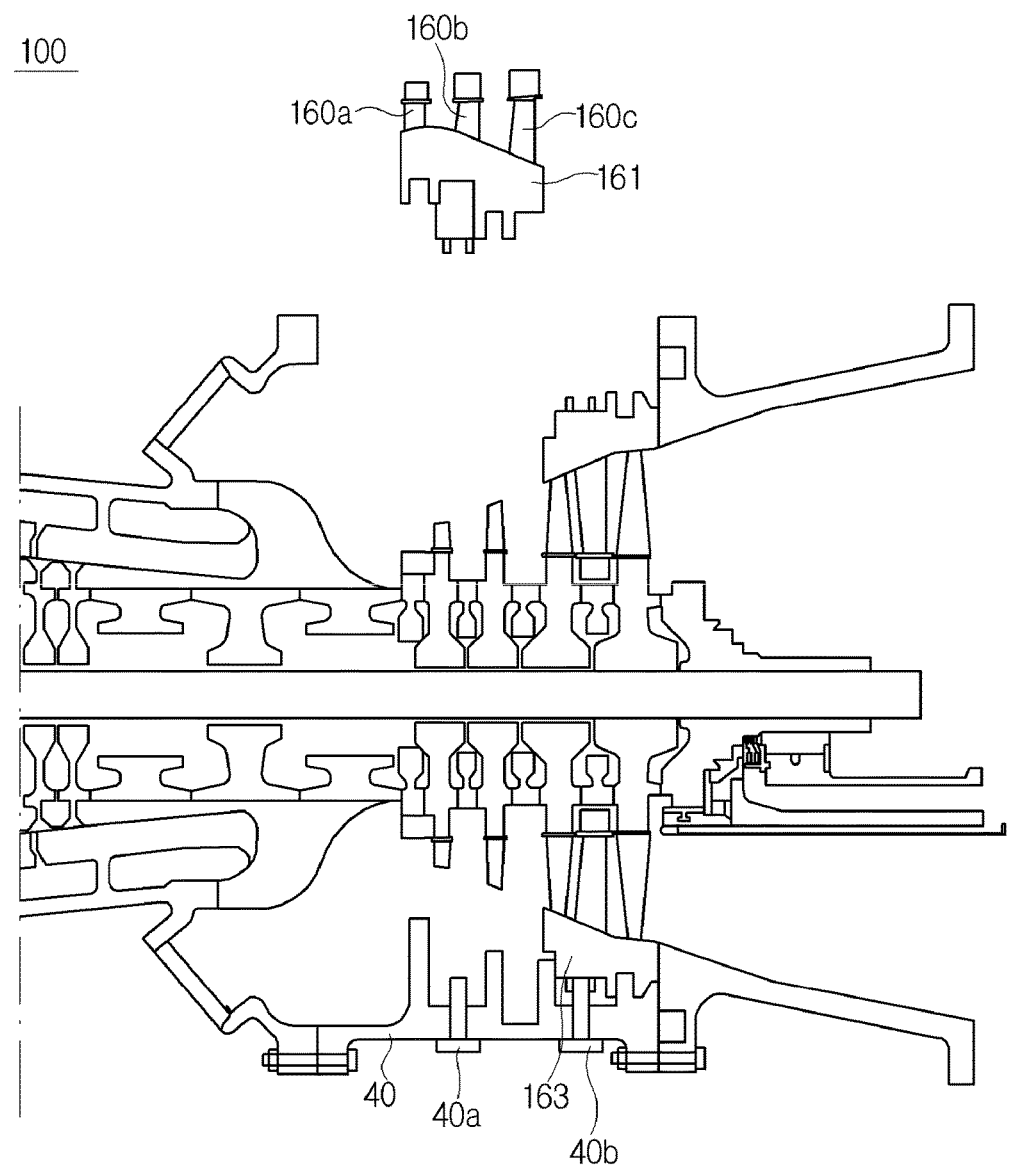

[FIG. 21]
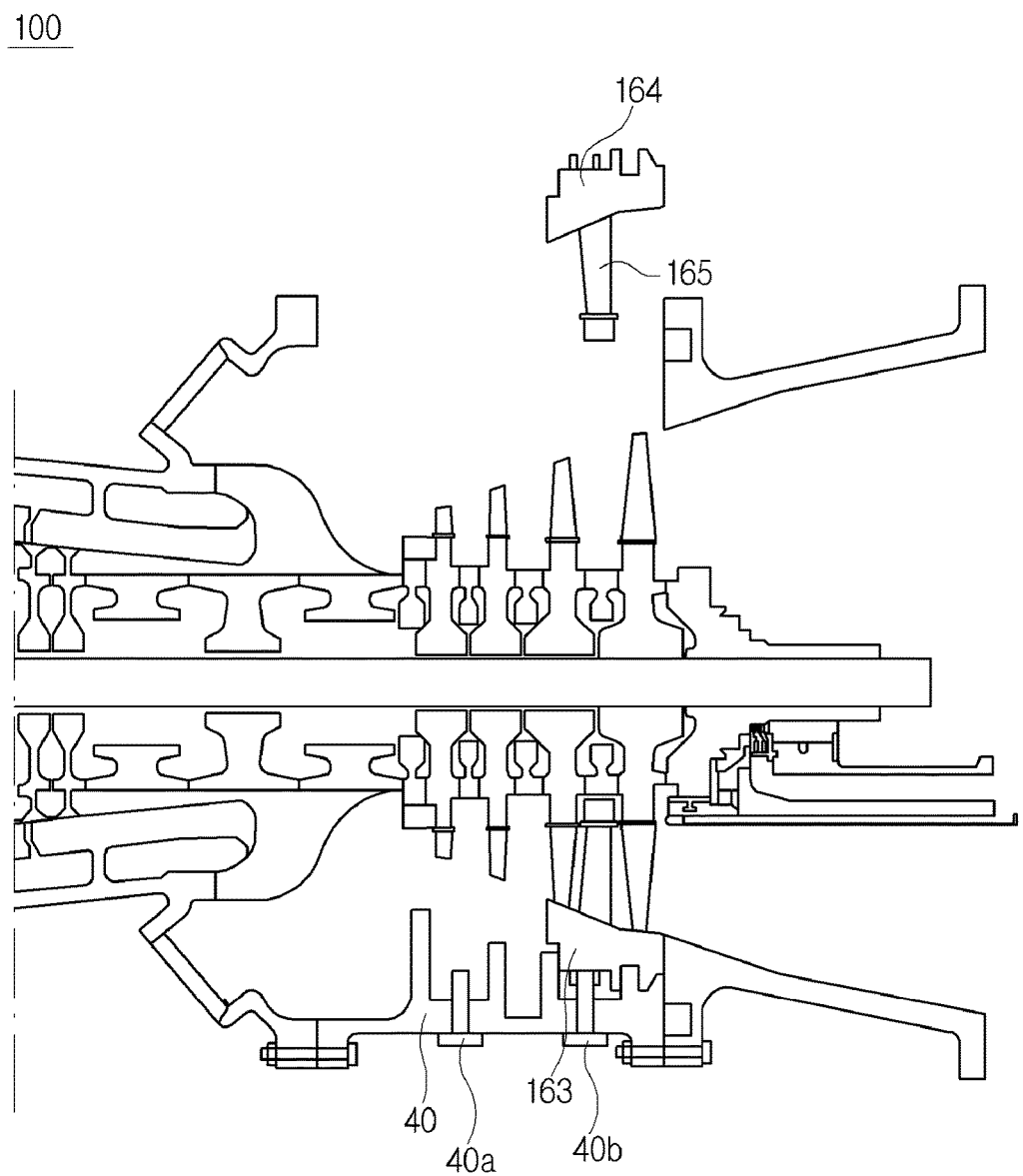

[FIG. 22]
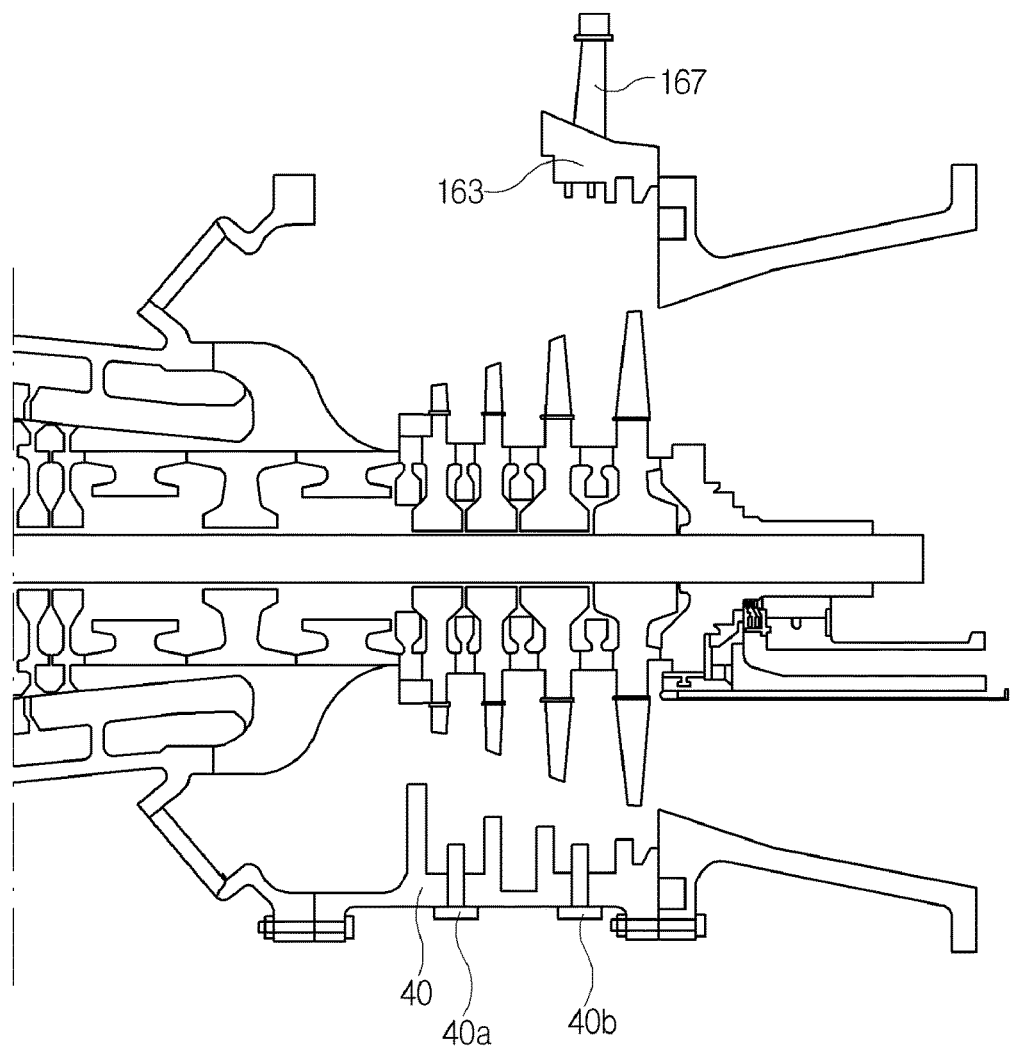

[FIG. 23]
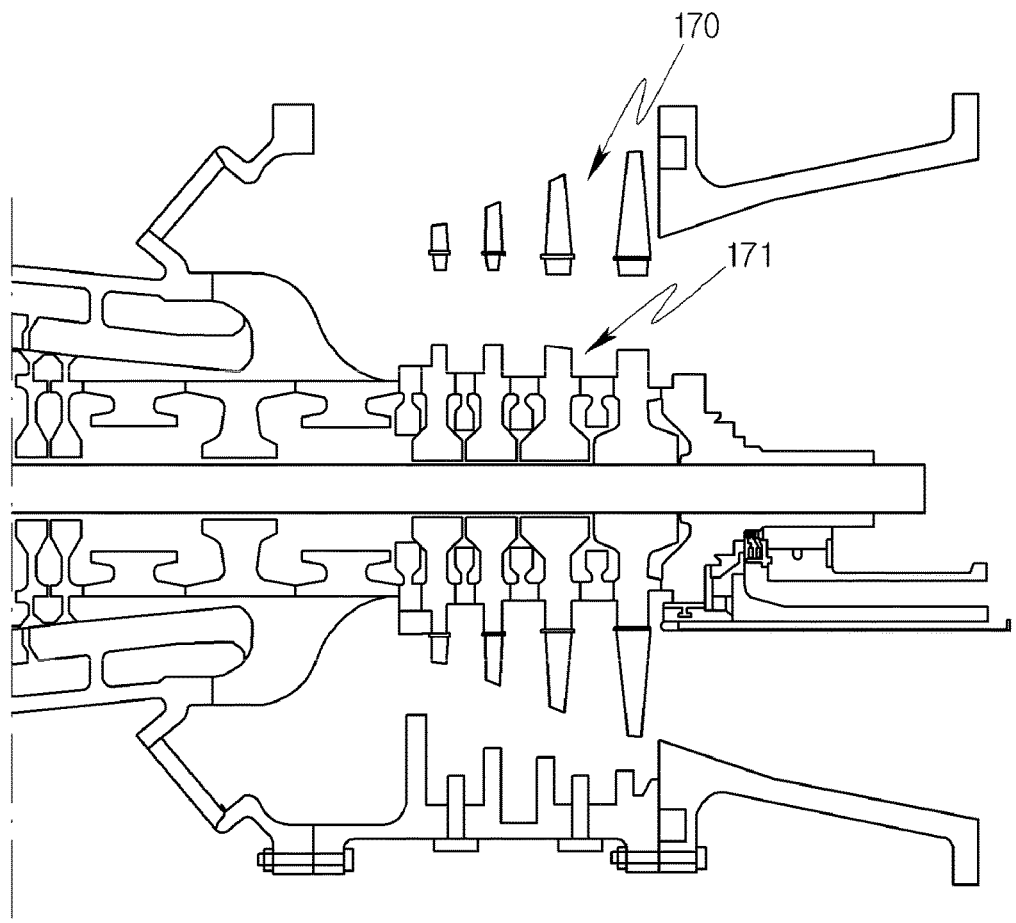

[FIG. 24]
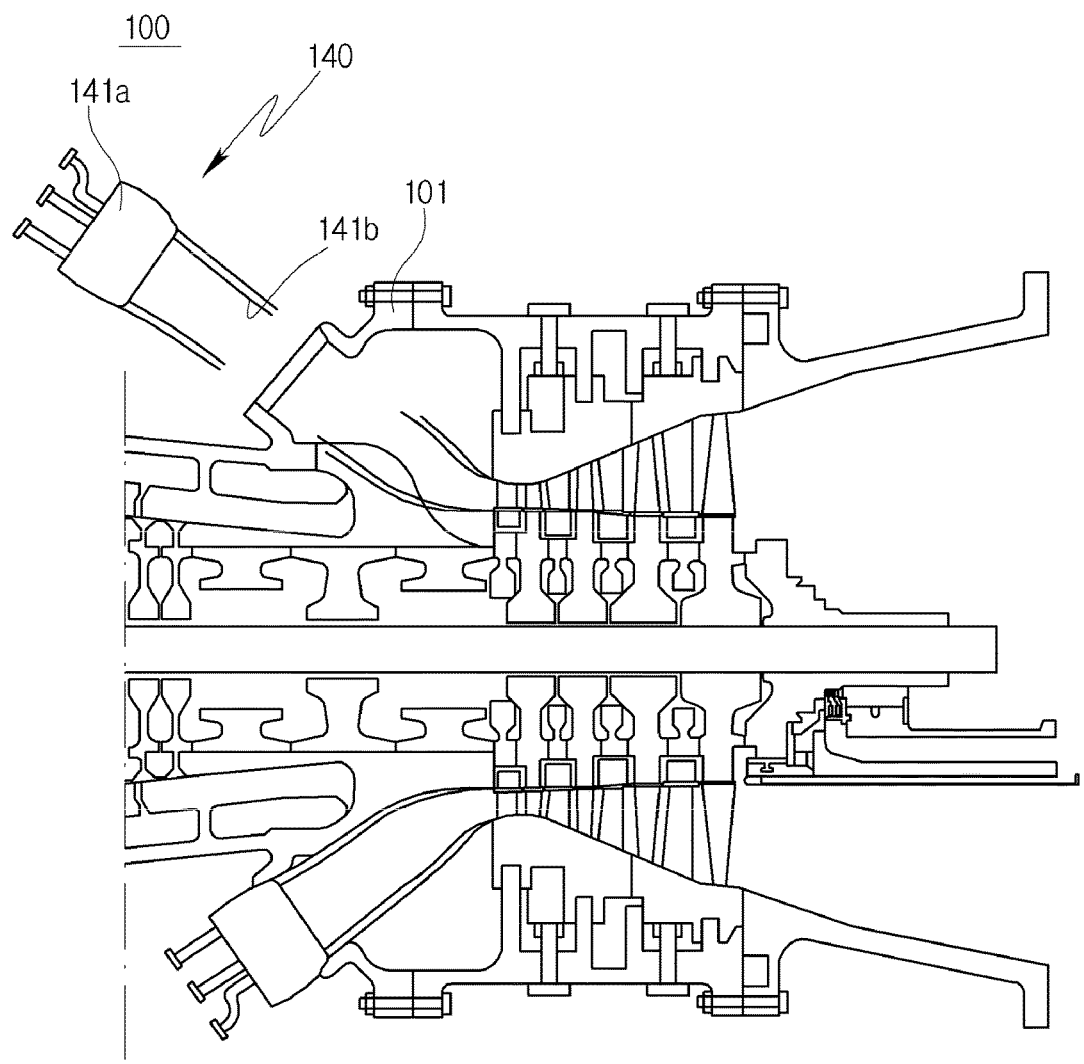

[FIG. 25]
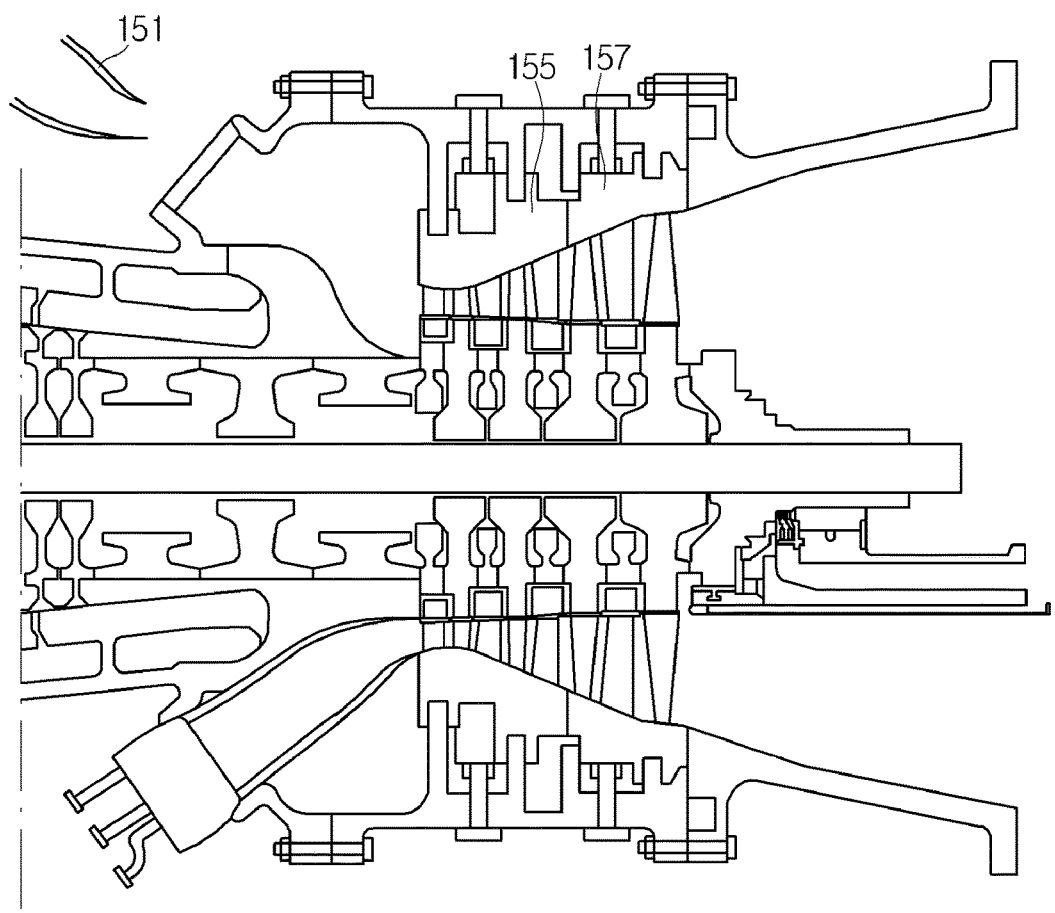

[FIG. 26]
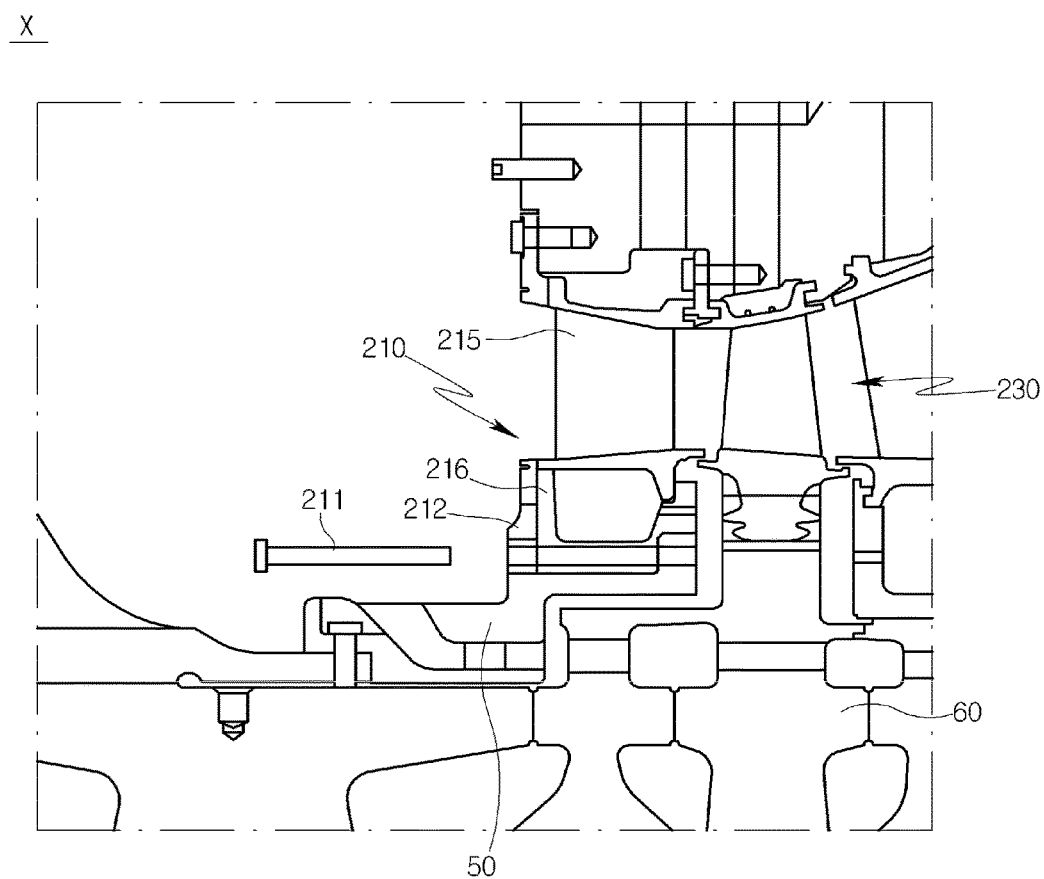

[FIG. 27]
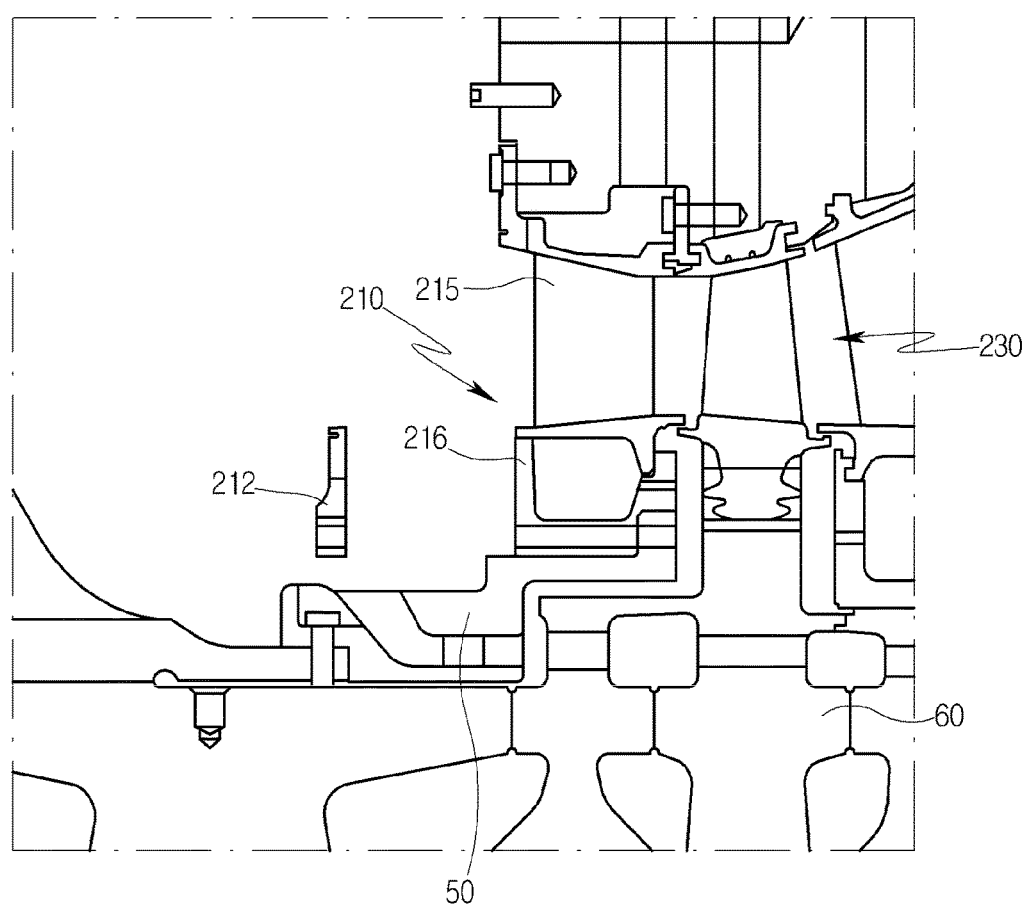

[FIG. 28]
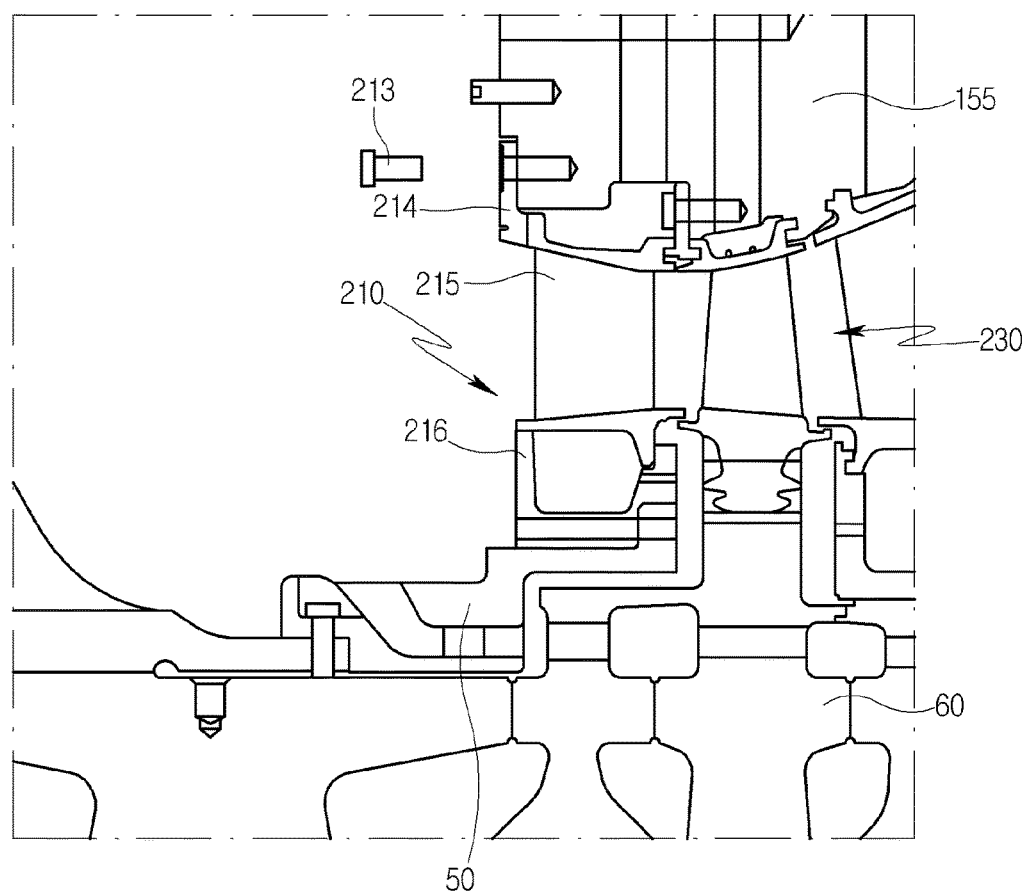

[FIG. 29]
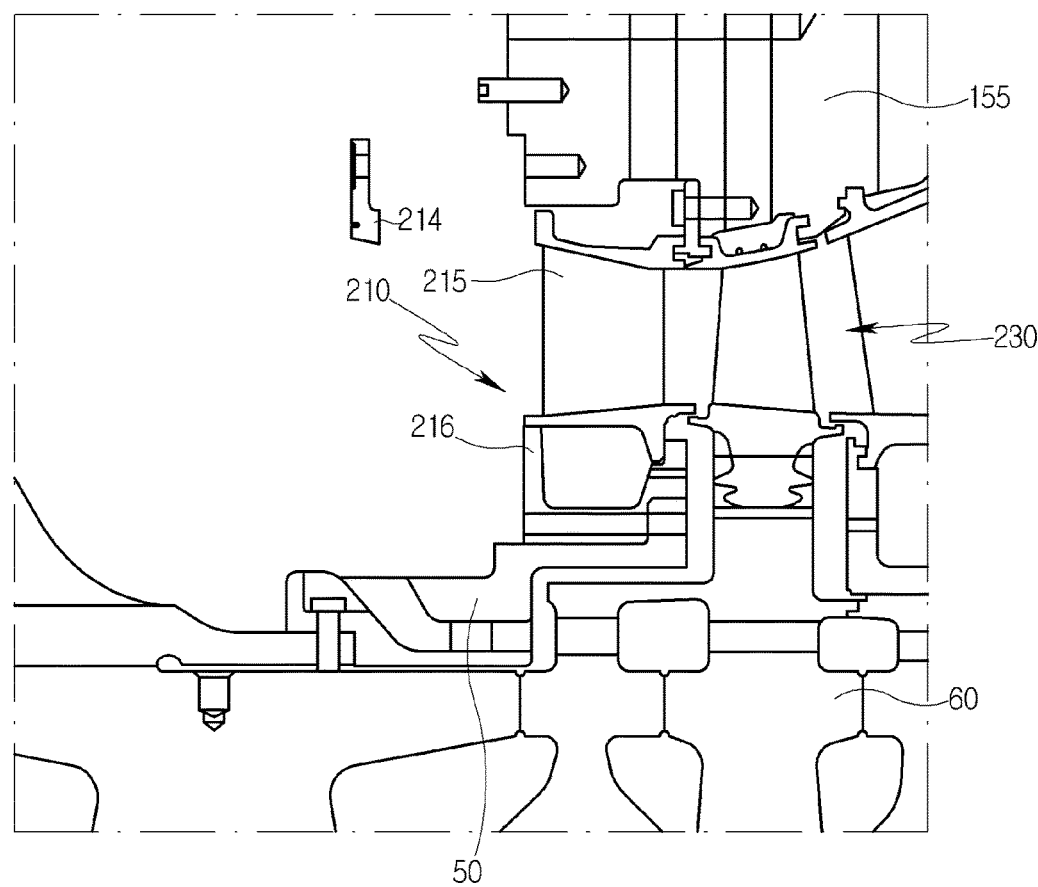

[FIG. 30]
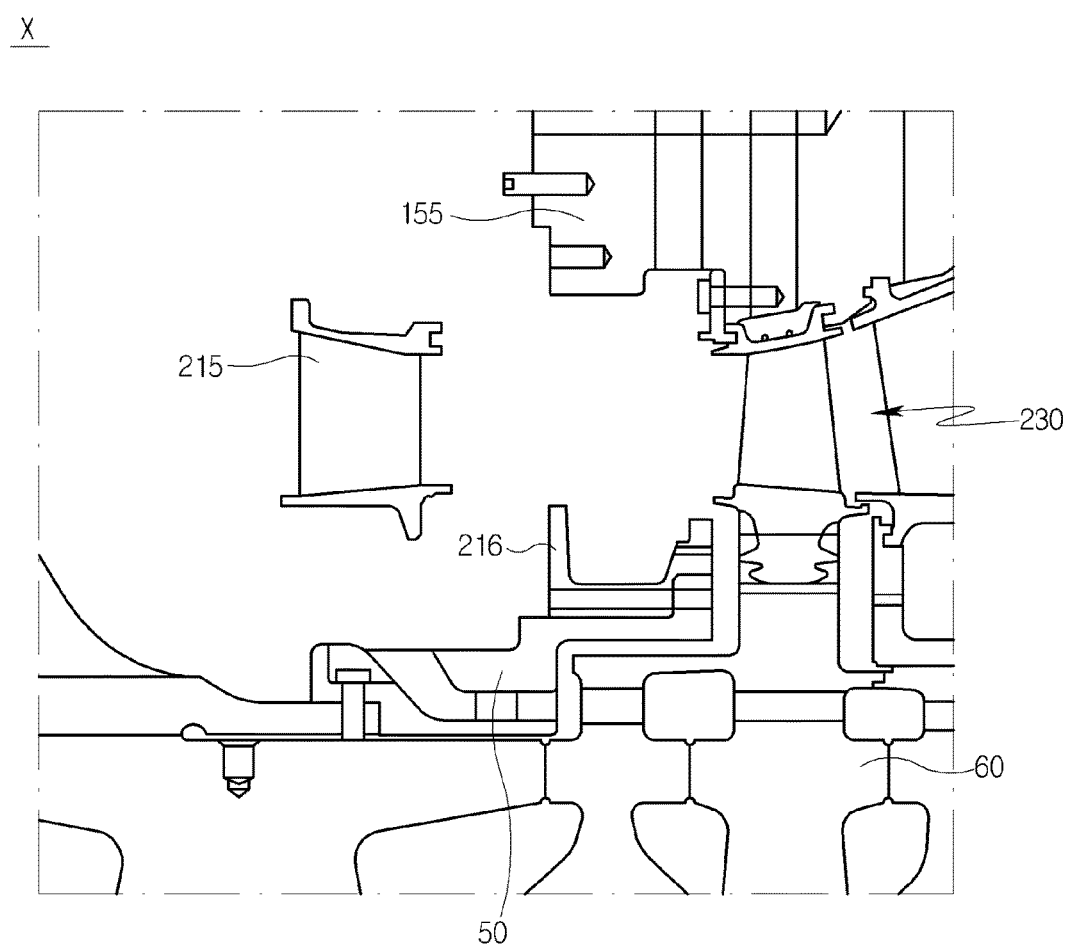

[FIG. 31]
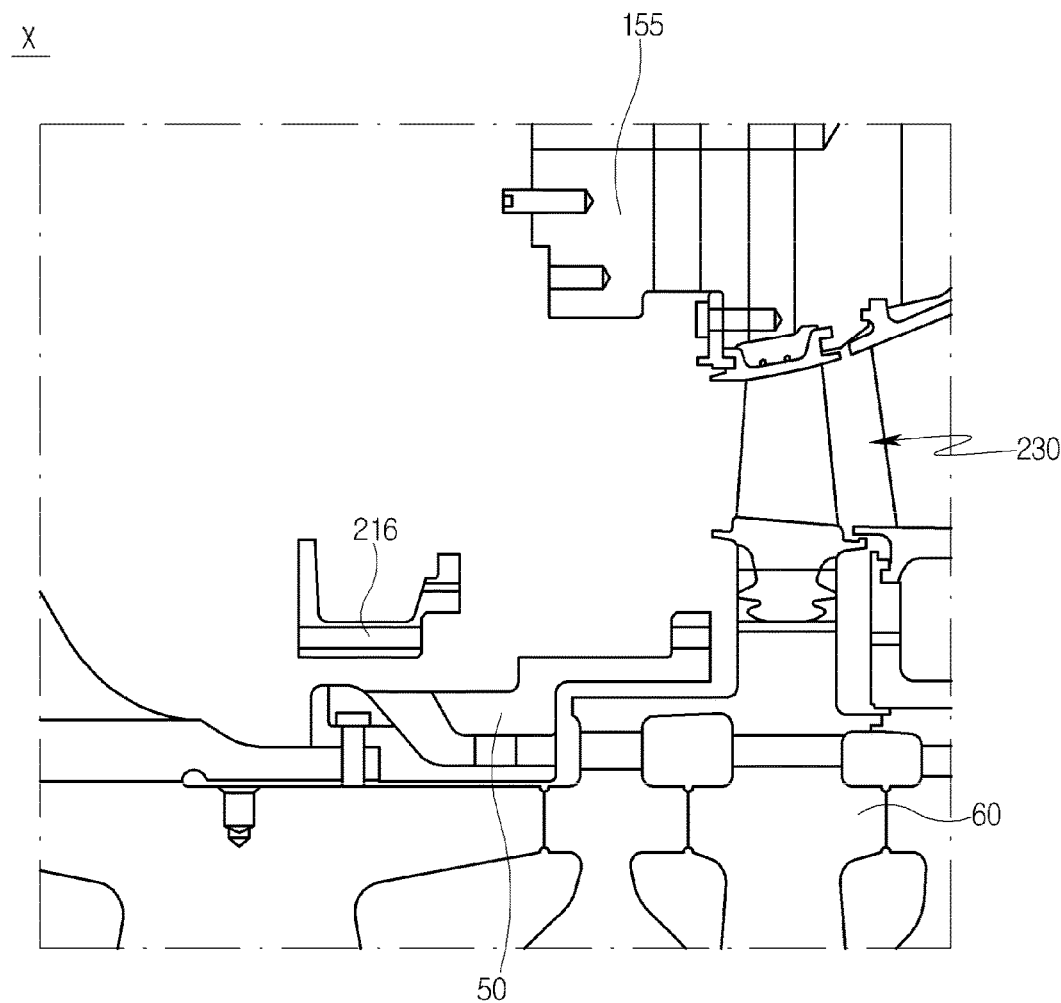

[FIG. 32]
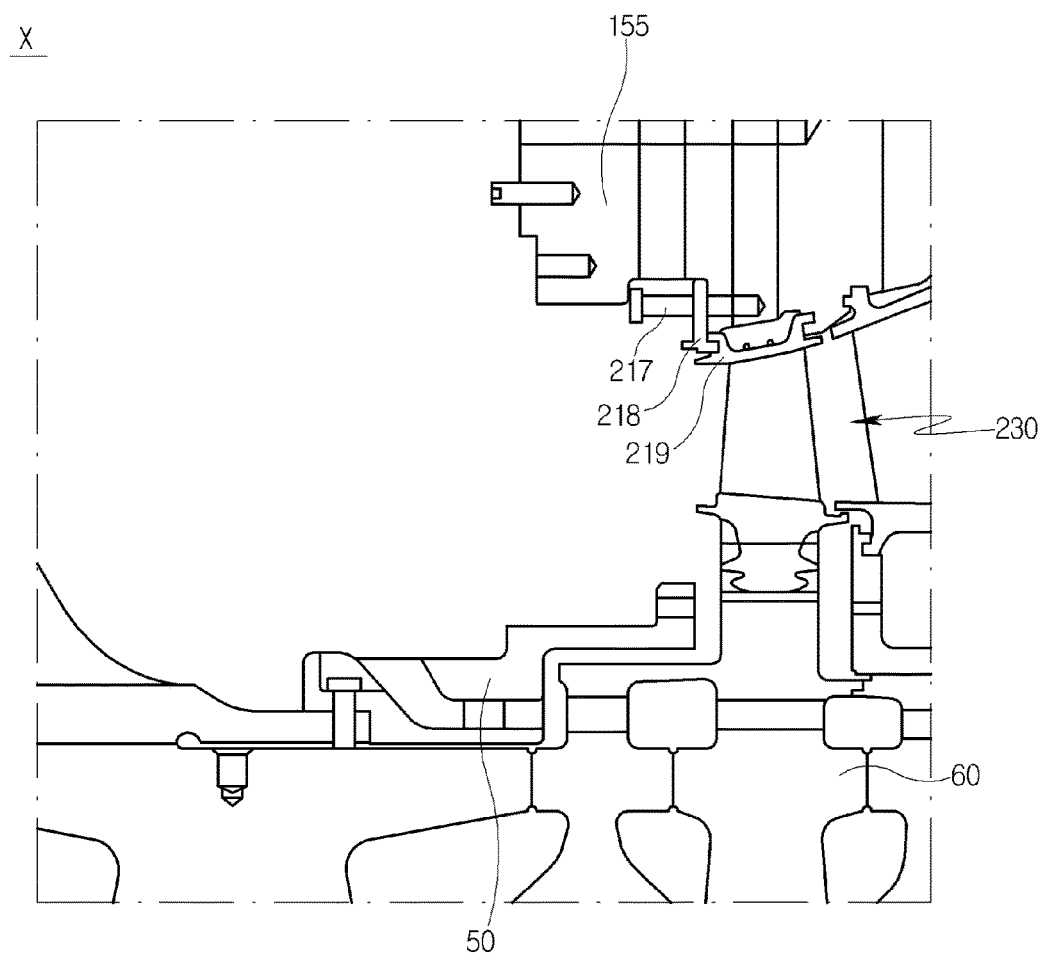

[FIG. 33]
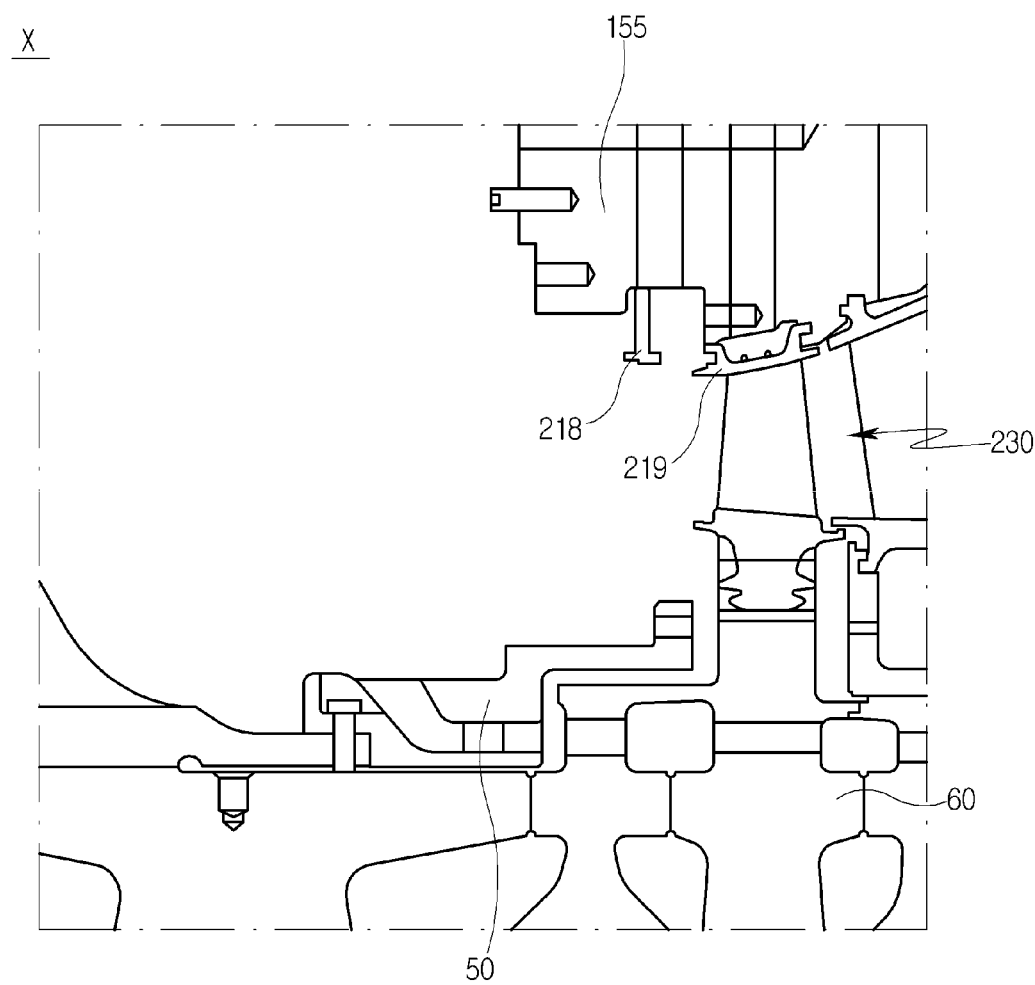

[FIG. 34]
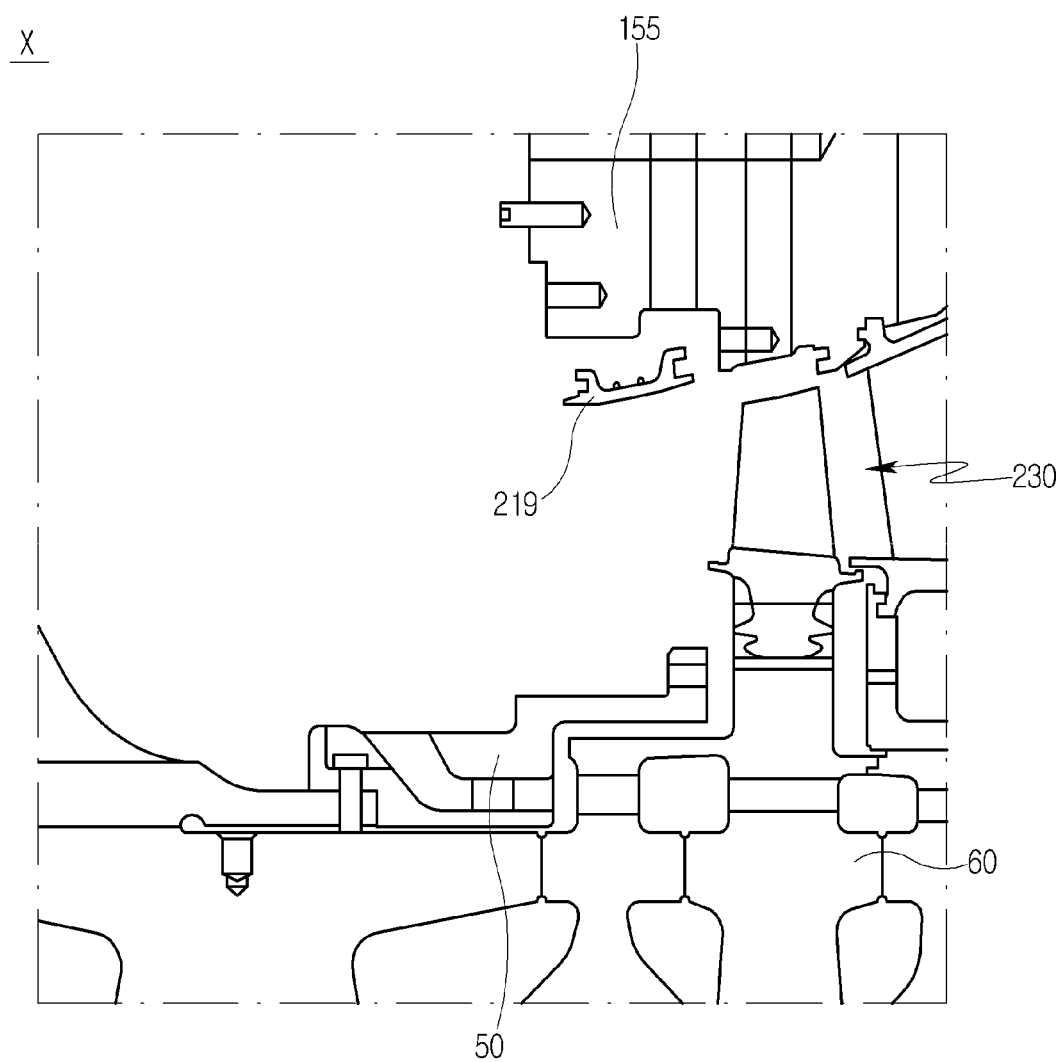

[FIG. 35]
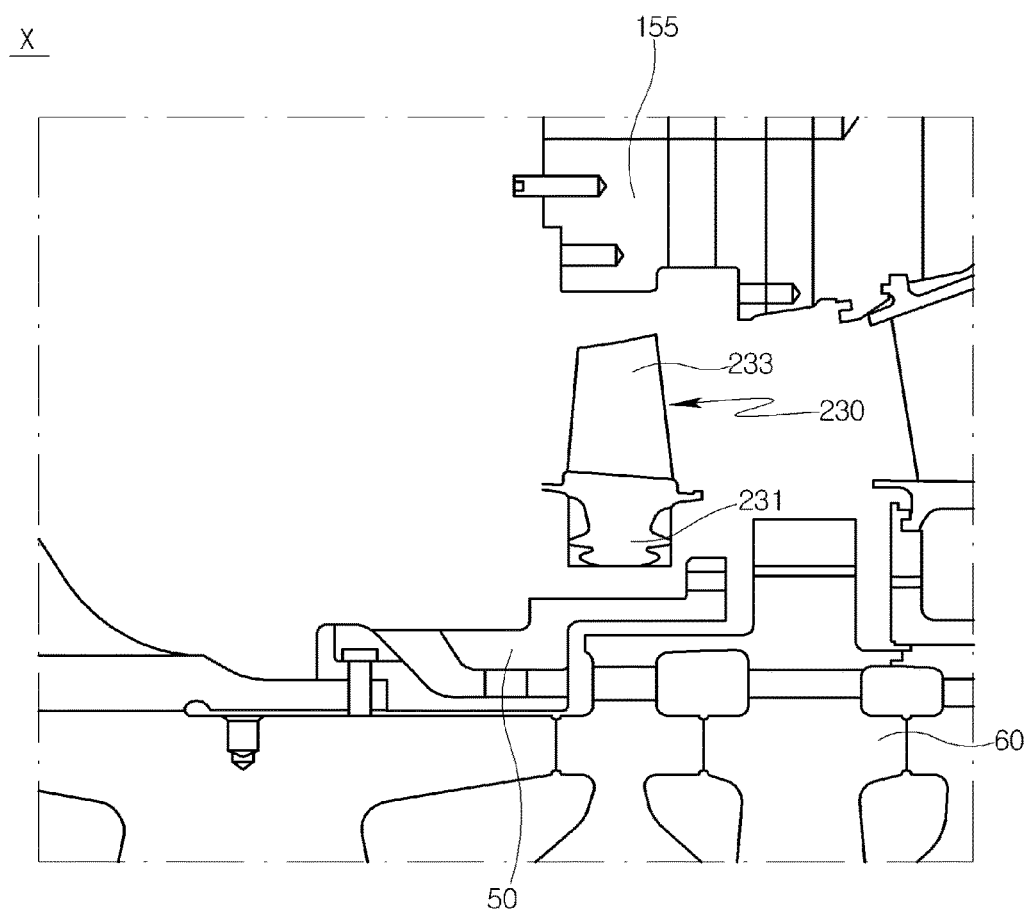

[FIG. 36]
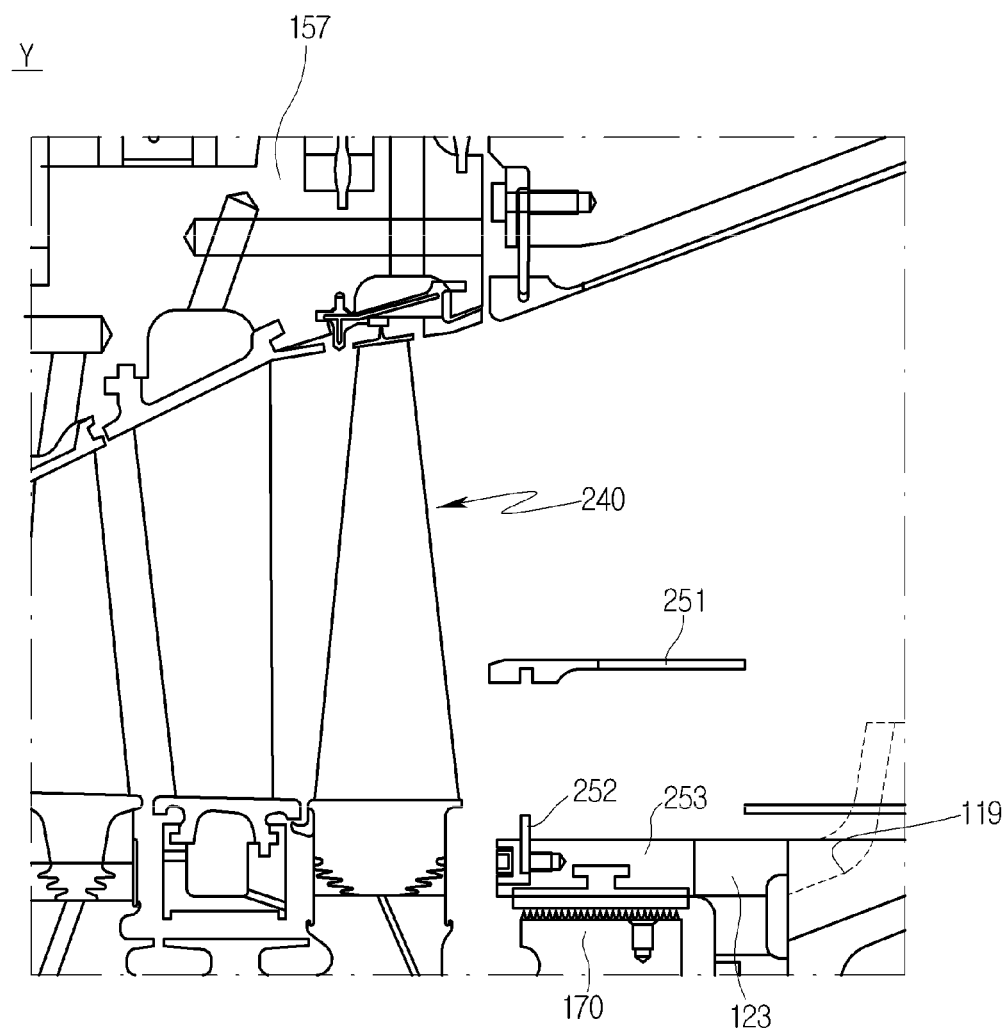

[FIG. 37]
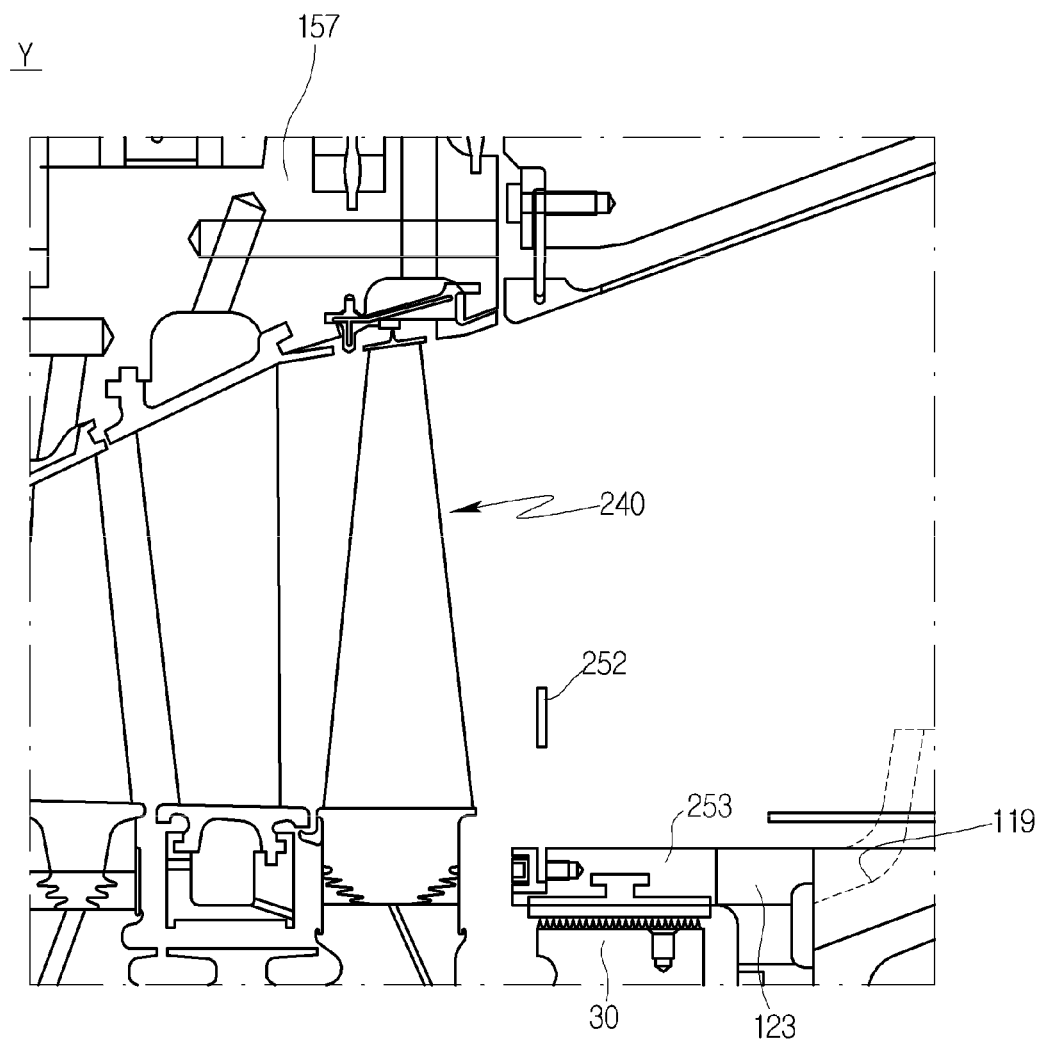

[FIG. 38]
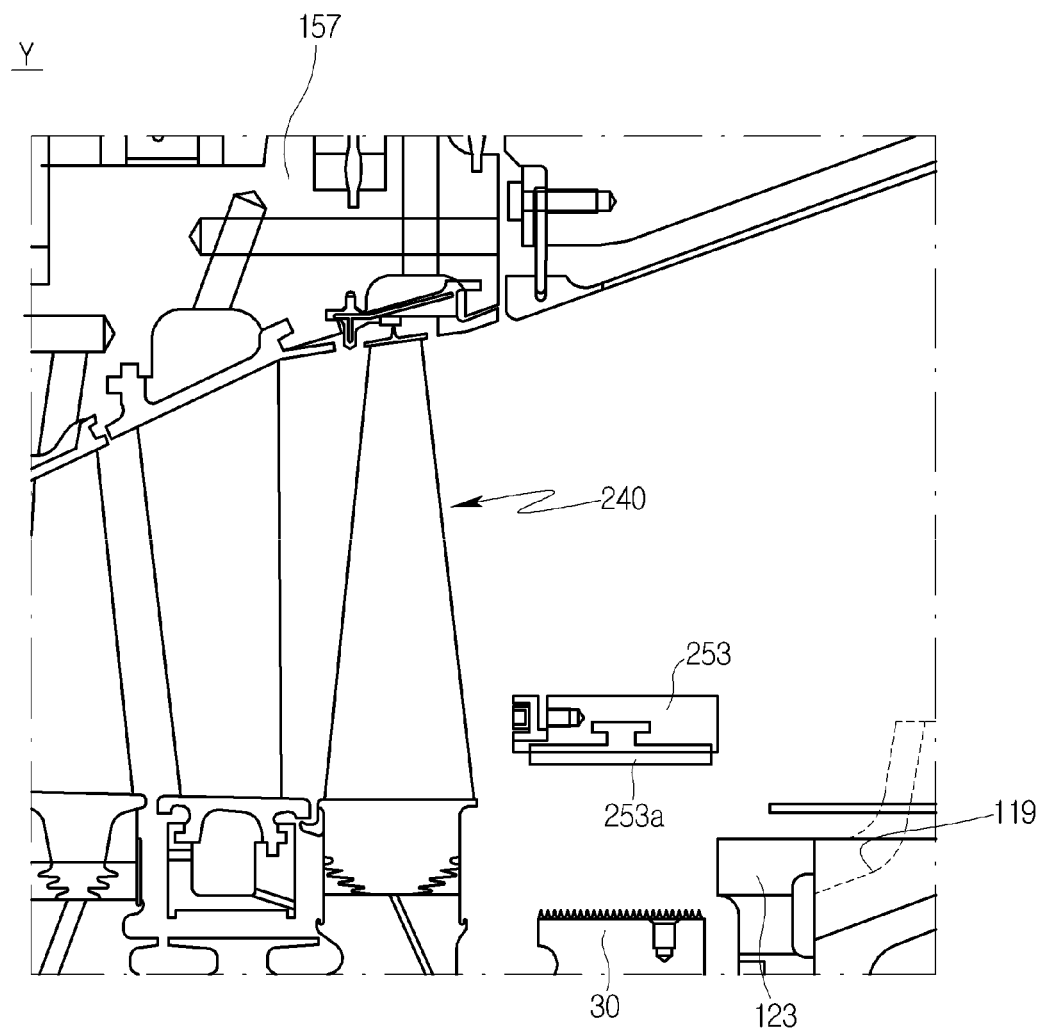

[FIG. 39]
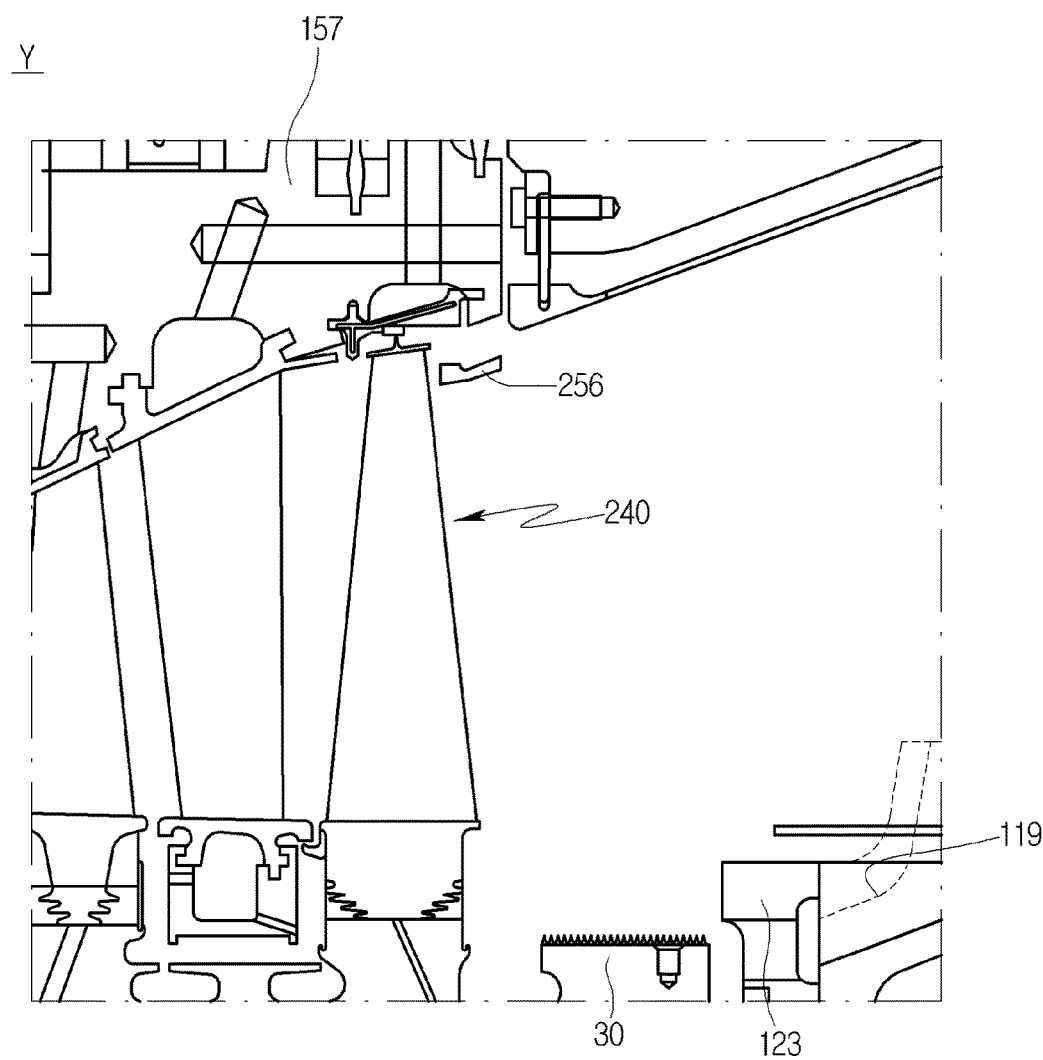

[FIG. 40]
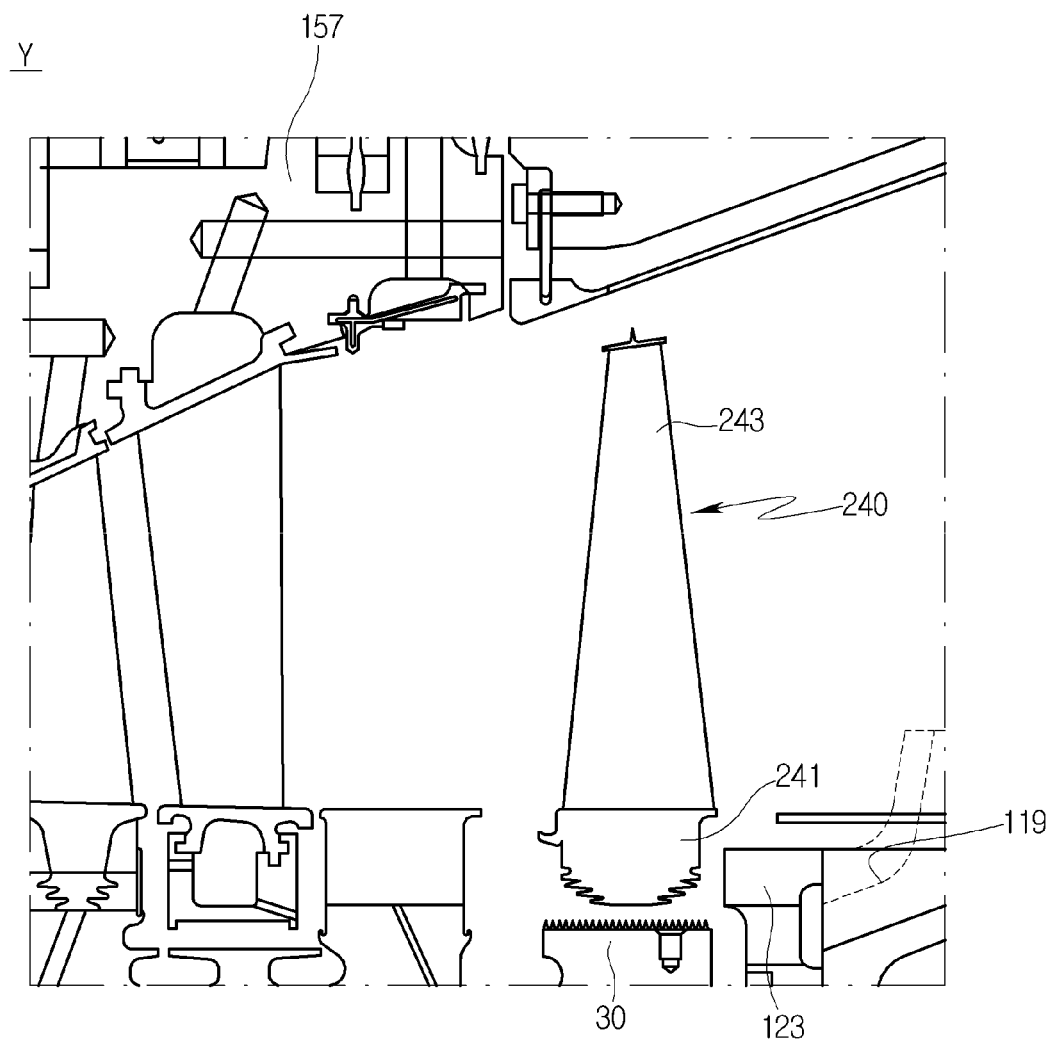

[FIG. 41]
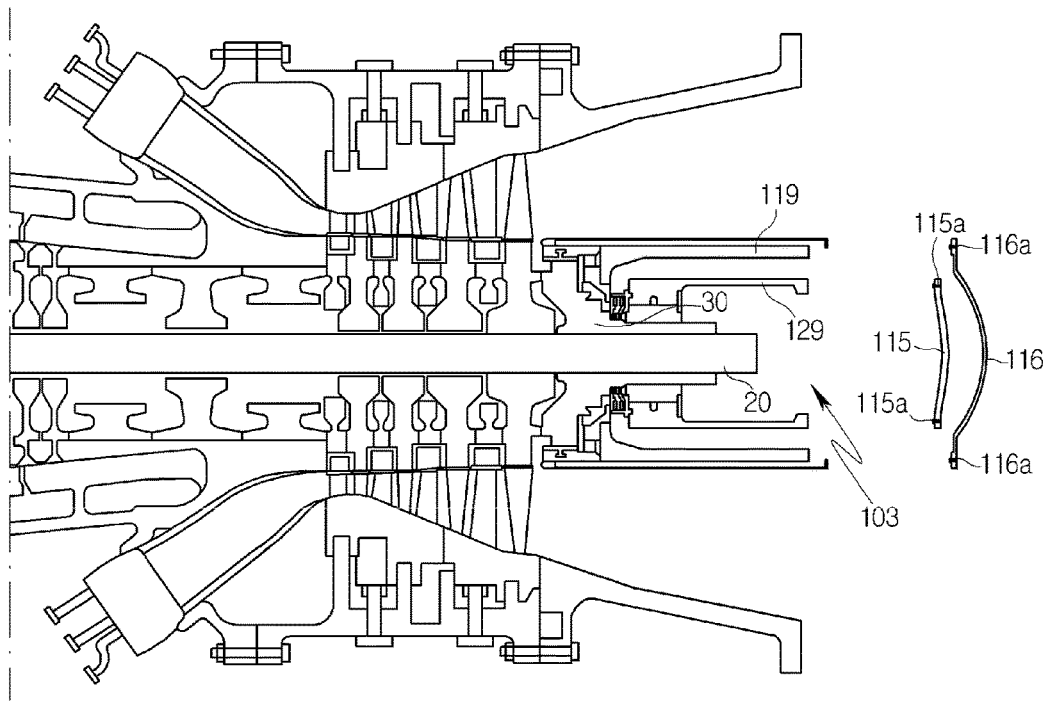

[FIG. 42]
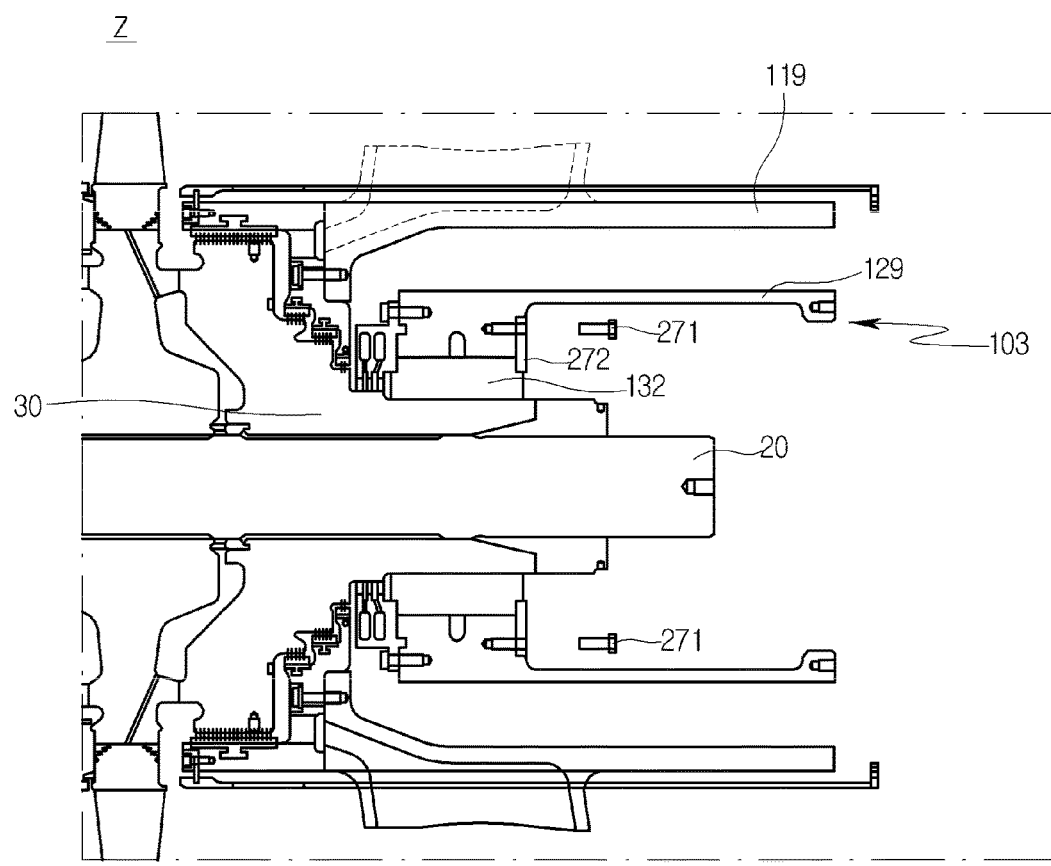

[FIG. 43]
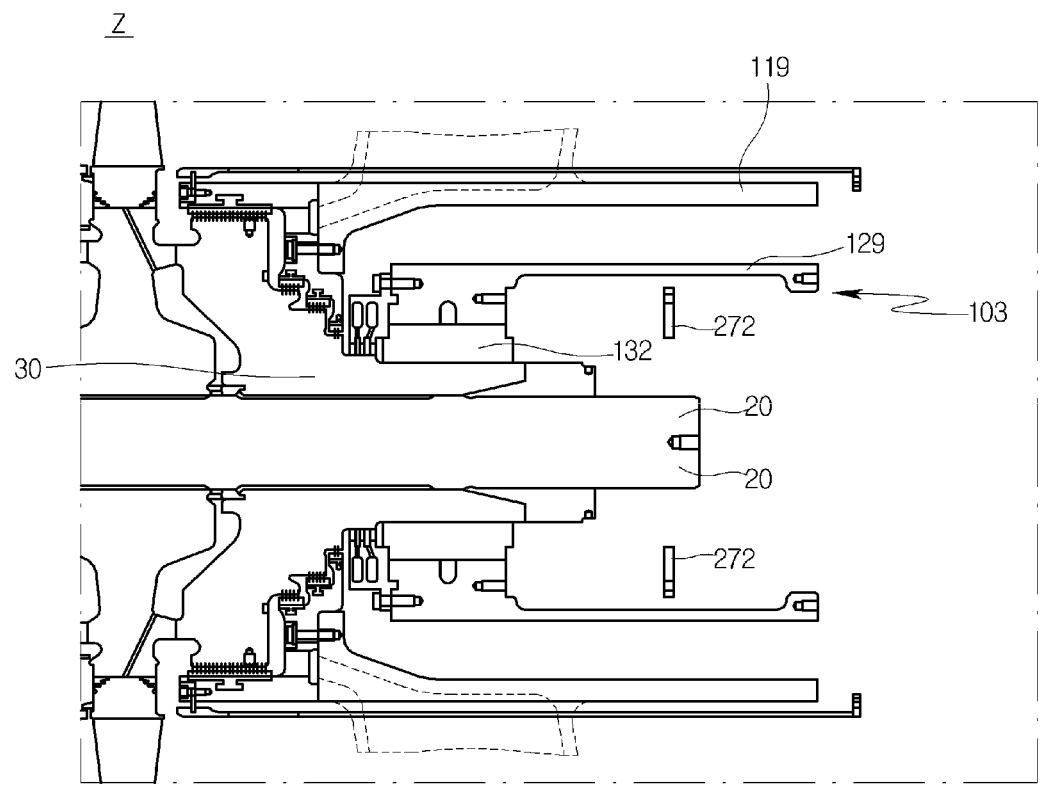

[FIG. 44]
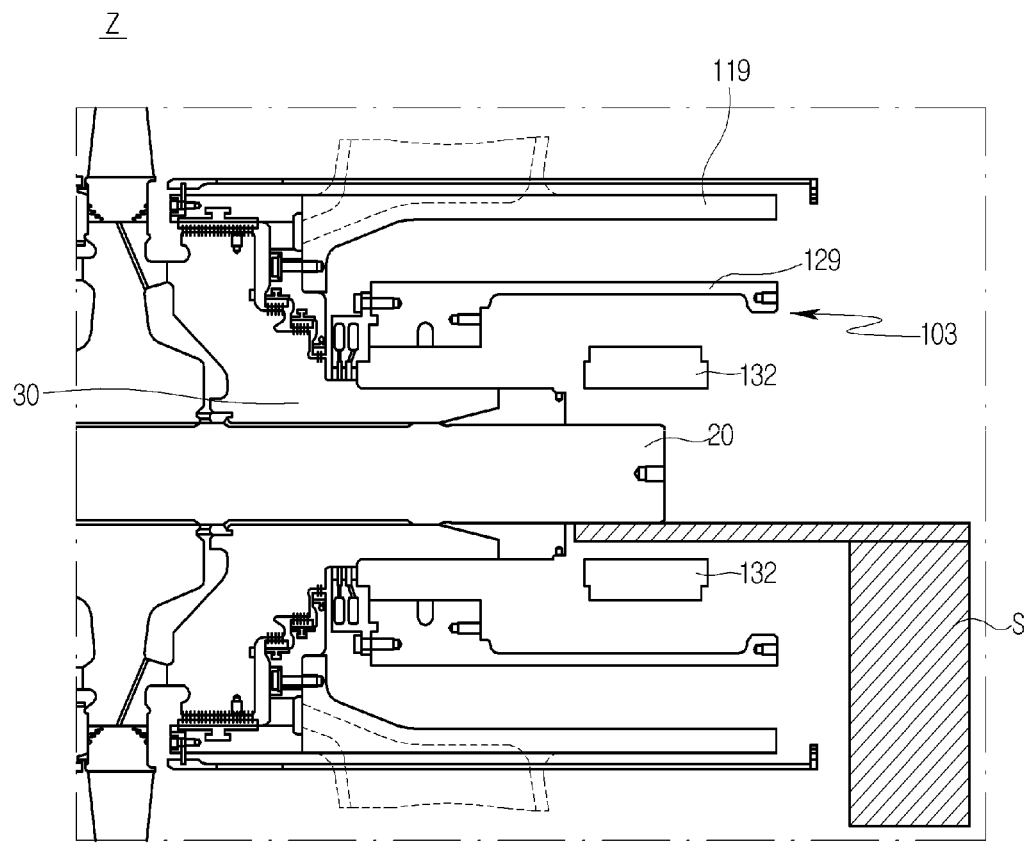

METHOD OF DISASSEMBLING AND ASSEMBLING GAS TURBINE AND GAS TURBINE ASSEMBLED THEREBY

CROSS-REFERENCE TO RELATED APPLICATION

This application claims priority to Korean Patent Application No. 10-2017-0081721, filed on Jun. 28, 2017, the disclosure of which is incorporated herein by reference in its entirety.

BACKGROUND OF THE INVENTION

Field of the Invention

Exemplary embodiments of the present invention relate to a method of disassembling and assembling a gas turbine and a gas turbine assembled thereby, and more particularly, and more particularly, to a method in which a variety of assembly and disassembly processes of a turbine section are provided, for implementation depending on the particular circumstances.

Description of the Related Art

In general, a turbine is a power generating device converting heat energy of fluids, such as gas and steam, into a torque, which is mechanical energy, and includes a rotor that includes a plurality of buckets or blades so as to be axially rotated by the fluids and a stator that is installed to surround a circumference of the rotor and includes a plurality of diaphragms or vanes.

Here, a gas turbine is configured to include a compressor section, a combustor section, and a turbine section. Here, outside air is sucked and compressed by a rotation of the compressor section and then is sent to the combustor section, and the compressed air and fuel is mixed with each other in the combustor section to be combusted. High-temperature, high-pressure gas generated from the combustor section rotates a rotation axis of the turbine while passing through the turbine section, thereby driving a generator.

Each manufacturer typically assembles and disassembles a gas turbine in a single, fixed manner. Accordingly, when there is a need for replacement or maintenance of specific components, the disassembly and reassembly processes of the gas turbine are carried out in the same fixed manner.

However, this one-size-fits-all assembly and disassembly process is problematic in that it is ineffective to cope with various situations, whereby workload may be increased.

SUMMARY OF THE INVENTION

Accordingly, the present invention has been made in view of the above-mentioned problem. It is therefore an object of the present invention to provide various methods of disassembling and assembling a turbine section to enable disassembly and assembly processes to be carried out according to circumstances, thereby improving work efficiency related to maintenance and reducing time and cost.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In order to accomplish the above objects, exemplary embodiments of the present invention relate to a method of disassembling and assembling a gas turbine and a gas turbine assembled thereby.

In accordance with one aspect of the present invention, there is provided a method of disassembling a turbine section from a gas turbine. The method may include sequential steps of (a) disassembling an upper turbine case; (b) disassembling a rear diffuser assembly and a rear bearing assembly; (c) disassembling a combustor assembly; (d) disassembling a vane assembly; and (e) disassembling a blade assembly.

The step (b) may include sequential steps of (b1) disassembling a rear diffuser cover from a rear diffuser; and (b2) disassembling a rear bearing housing cover from a rear bearing housing.

After the step (b2), the step (b) may further includes (b3) disassembling an upper turbine frame, which is integrally connected to a rear diffuser and a strut, from an upper rear vane carrier assembly.

After the step (b3), the step (b) may further include sequential steps of (b4) disassembling an upper thrust balance seal and an upper honeycomb seal from the rear diffuser; and (b5) disassembling a lower honeycomb seal from a lower thrust balance seal assembly.

After the step (b5), the step (b) may further include (b6) disassembling an upper rear bearing housing and an upper oil seal housing from a rear bearing.

After the step (b6), the step (b) may further include sequential steps of (b7) disassembling a lower knife edge seal from a lower oil seal housing; and (b8) disassembling an upper rear bearing from a rotor shaft support.

The step (c) may include sequential steps of (c1) disassembling a combustor head assembly and a liner from a combustor mounting portion; and (c2) disassembling a transition piece from an upper front vane carrier assembly.

The step (d) may include sequential steps of (d1) disassembling an upper front vane carrier assembly from an upper rear vane carrier assembly; and (d2) disassembling a lower front vane carrier assembly from a lower rear vane carrier assembly and a lower turbine case.

Each of the steps (d1) and (d2) may include (d1a, d2a) disassembling first-stage to third-stage vanes and a U-seal.

The step (d) may further include sequential steps of (d3) disassembling an upper rear vane carrier assembly by separating a contact part from a lower rear vane carrier assembly; and (d4) disassembling the lower rear vane carrier assembly from a lower turbine case.

Each of the steps (d3) and (d4) may include (d3a, d4a) disassembling a fourth-stage vane and a U-seal.

The step (e) may include (e1) disassembling first-stage to fourth-stage blades.

In accordance with another aspect of the present invention, there is provided a method of disassembling a gas turbine for disassembling first-stage to fourth-stage blade assemblies and first-stage to fourth-stage vane assemblies in a turbine section from the gas turbine. The method may include sequential steps of (a) disassembling an upper turbine case; (b) disassembling a combustor assembly; c) disassembling a vane assembly; and (d) disassembling a blade assembly.

The step (b) may include sequential steps of (b1) disassembling a combustor head assembly and a liner from a combustor mounting portion; and (b2) disassembling a transition piece from an upper front vane carrier assembly.

The step (c) may include sequential steps of (c1) disassembling an upper front vane carrier assembly from an upper rear vane carrier assembly; and (c2) disassembling a lower front vane carrier assembly from a lower rear vane carrier assembly and a lower turbine case.

Each of the steps (c1) and (c2) may include (c1a, c2a) disassembling first-stage to third-stage vanes and a U-seal.

The step (c) may further include sequential steps of (c3) disassembling an upper rear vane carrier assembly by separating a contact part from a lower rear vane carrier assembly; and (c4) disassembling a lower rear vane carrier assembly from a lower turbine case.

Each of the steps (c3) and (c4) may include (c3a, c4a) disassembling a fourth-stage vane and a U-seal.

The step (d) may include (d1) disassembling first-stage to fourth-stage blades.

In accordance with another aspect of the present invention, there is provided a gas turbine include a compressor section configured to compress air introduced from outside the gas turbine; a combustor section configured to be connected to the compressor section and mix the compressed air with fuel and combust the mixture; and the turbine section configured to be connected to a combustor assembly of the combustor section and assembled in a reverse order with respect to the above disassembly method.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic diagram of a turbine section for illustrating a method of disassembling and assembling a gas turbine according to various embodiments of the present invention;

FIGS. 2-15 are schematic diagrams of the turbine section of FIG. 1, in which a method according to a first embodiment of the present invention is shown in sequence, respectively, disassembling each of an upper turbine case (FIG. 2), a rear diffuser cover and a rear bearing housing cover (FIG. 3), an upper turbine frame and an upper thrust balance seal assembly (FIG. 4), a lower honeycomb seal (FIG. 5), an upper rear bearing housing and an upper oil seal housing (FIG. 6), a lower knife edge seal (FIG. 7), an upper rear bearing (FIG. 8), a combustor head assembly and a liner (FIG. 9), a transition piece (FIG. 10), an upper front vane carrier assembly (FIG. 11), a lower front vane carrier assembly (FIG. 12), an upper rear vane carrier assembly (FIG. 13), a lower rear vane carrier assembly (FIG. 14), and a blade assembly (FIG. 15);

FIGS. 16-23 are schematic diagrams of the turbine section of FIG. 1, in which a method according to a second embodiment of the present invention is shown in sequence, respectively, disassembling each of an upper turbine case (FIG. 16), a combustor head assembly and a liner (FIG. 17), a transition piece (FIG. 18), an upper front vane carrier assembly (FIG. 19), a lower front vane carrier assembly (FIG. 20), an upper rear vane carrier assembly (FIG. 21), a lower rear vane carrier assembly (FIG. 22), and a blade assembly (FIG. 23);

FIGS. 24-35 are schematic diagrams of the turbine section of FIG. 1, in which a method according to a third embodiment of the present invention is shown in sequence, respectively, disassembling each of a combustor head assembly and a liner (FIG. 24), a transition piece (FIG. 25), an inner seal carrier bolt (FIG. 26), a first-stage vane inner fixture (FIG. 27), an outer seal carrier bolt (FIG. 28), a first-stage vane outer fixture (FIG. 29), a first-stage vane (FIG. 30), a first-stage U-ring (FIG. 31), a first-stage ring segment fixing bolt (FIG. 32), a first-stage ring segment fixture (FIG. 33), a first-stage ring segment (FIG. 34), and a first-stage blade and a first-stage blade fixture (FIG. 35);

FIGS. 36-40 are schematic diagrams of the turbine section shown in FIG. 1, in which a method according to a fourth embodiment of the present invention is shown in sequence, respectively, disassembling each of a diffuser loading slot (FIG. 36), a diffuser seal loading slot (FIG. 37), a thrust balance seal assembly loading slot (FIG. 38), a fourth-stage blade seal ring loading slot (FIG. 39), the fourth-stage blade assembly (FIG. 40); and FIGS. 41-44 are schematic diagrams of the turbine section shown in FIG. 1, in which a method according to a fifth embodiment of the present invention is shown in sequence, respectively, disassembling each of a rear diffuser cover and a rear bearing housing cover (FIG. 41), a rear bearing flange bolt (FIG. 42), a rear bearing flange (FIG. 43), and a rear bearing (FIG. 44).

DESCRIPTION OF SPECIFIC EMBODIMENTS

Hereinafter, a method of disassembling and assembling a gas turbine according to the present invention and preferred embodiments of a gas turbine assembled thereby will be described in detail with reference to the accompanying drawings.

Before describing the exemplary embodiments of the present invention, the structure of the gas turbine, which is an example of a turbomachine pertaining to the present invention, will be described. However, the present invention may also be applied to other gas turbines and should not be construed as limited to the structure set forth hereinafter.

The gas turbine pertaining to the present invention includes a compressor, a set of combustors, and a turbine as basic components, and a casing, which essentially corresponds to the gas turbine's body. The compressor is forwardly disposed inside the casing and the turbine is rearwardly disposed inside the casing, such that with respect to airflow directionality, the compressor section of the gas turbine has an upstream disposition and the gas turbine section of the gas turbine has a downstream disposition. The casing is provided with a set of channels through which the combustors are respectively connected between the compressor and the turbine, which forms a combustor section.

In order to produce power, outside air is introduced to the compressor section for an adiabatic compression process, the compressed air is introduced to the combustor section to be mixed with fuel for an isobaric combustion process, and the combustion gas is introduced to the turbine section for an adiabatic expansion process. The combustion gas, which generates power by passing through the turbine, is discharged from the gas turbine through an exhaust diffuser disposed in the rear of the casing.

At this time, the compressor and the turbine may be connected to each other by a single rotor shaft, or tie rod, and thus are configured to rotate integrally. This configuration is beneficial in terms of production cost and operation, since gas turbines generally employed in power plants are driven continuously.

Mounted to an outer circumferential surface of the rotor shaft in the compressor section are a plurality of disks axially arranged. A plurality of buckets are radially arranged, on each disk, in correspondence to rotor blades. The buckets may be coupled to a disk using an axial-type or a tangential-type coupling method, both of which are currently commercialized methods.

In the axial-type coupling method, the lower end of each bucket is dovetailed for coupling to a bucket mounting portion, provided on the periphery of the associated disk, by inserting the bucket dovetails into the bucket mounting portion in the axial direction of the rotor shaft. In the tangential-type coupling method, each bucket is fitted into and coupled to the bucket mounting portion in the circumferential direction of the rotor shaft.

An upper end of each bucket may be provided with a platform on which a blade is disposed. In this case, a plurality of disk-shaped diaphragms is fixedly arranged in rows on an inner circumferential surface of the casing, and a plurality of vanes or nozzles are mounted on each of the diaphragms in the radial direction. The rotor shaft passes through the center of each diaphragm. As the shaft rotates, creating a mutual rotation of the buckets and the vanes (or nozzles) disposed on the diaphragms, air introduced from outside the gas turbine is compressed between the vanes and the buckets. That is, combustion gas generated in the combustor section is expanded by mutual rotation of the turbine blades and the vanes (or nozzles) disposed on the diaphragms and is used to produce power in the turbine section.

The combustor section is disposed in the casing between the compressor section and the turbine section. In the combustor section, a plurality of combustors is arranged in cell form in the radial direction of the casing. Each combustor is configured to include components such as a combustor head assembly, a liner that defines a combustion chamber, a flow sleeve that guides the flow of air, and a transition piece that allows combustion gas to flow to the turbine section. The combustor head assembly includes a fuel injection nozzle, an ignition plug, and the like.

Air, which is compressed in and introduced from the compressor section, is mixed with fuel injected from the combustor section for combustion and then flows to the turbine section. The combustion gas having passed through the turbine section is discharged to the outside through the exhaust diffuser at the rear of the casing. Here, a gas turbine used in a combined generation system is configured such that the exhaust gas discharged from the exhaust diffuser is introduced to a steam turbine via heat exchangers for other power generation. In this case, the pressure and velocity of the exhaust gas discharged from the exhaust diffuser may be critical factors. Therefore, for smooth operation of the turbine, the exhaust gas must be introduced to the steam turbine at constant pressure and velocity.

Hereinafter, in the present invention, the non-rotational component such as a casing, a diaphragm, or a combustor may be referred to as a fixed unit or a stator, and the rotational component such as a rotor shaft, a tie rod, a compressor, or a turbine may be referred to as a rotating unit or a rotor.

According to the present invention, a gas turbine may be divided into a compressor section, a combustor section, and a turbine section as described above. FIG. 1 shows a turbine section 100 of a gas turbine arranged according to exemplary embodiments of the present invention and serves to illustrate a method of disassembling and assembling (reassembling) a gas turbine according to first to fifth embodiments of the present invention. As such, FIG. 1 illustrates the turbine section 100 of the gas turbine before its disassembly for maintenance or component replacement in accordance with the respective embodiments. In the present application, the disassembly and disassembling of a gas turbine component may refer to the component being removed from the remainder of the gas turbine or to decoupling the component and the remainder of the gas turbine.

FIG. 1 is a cross-sectional profile view, along a varying line through a gas turbine, and is thus a conceptualized representation of the relevant components under consideration. Cross-sectional areas X, Y, and Z relate specifically to the third, fourth, and fifth embodiments, respectively.

Table 1 relates to drawings pertaining to the first exemplary embodiment of the present invention.

TABLE 1

First Embodiment

| Drawing | Component(s) being disassembled and/or removed |
| --- | --- |
| FIG. 2 | upper turbine case 113 |
| FIG. 3 | rear diffuser cover 116, rear bearing housing cover 115 |
| FIG. 4 | upper turbine frame 118, upper thrust balance seal assembly 123 |
| FIG. 5 | lower honeycomb seal 126 |
| FIG. 6 | upper rear bearing housing 129, upper oil seal housing 130 |
| FIG. 7 | lower knife edge seal 134 |
| FIG. 8 | upper rear bearing 132 (journal bearing) |
| FIG. 9 | combustor head assembly 141a, liner 141b |
| FIG. 10 | transition piece 151 |
| FIG. 11 | upper front vane carrier assembly 155 |
| FIG. 12 | lower front vane carrier assembly 161 |
| FIG. 13 | upper rear vane carrier assembly 157 |
| FIG. 14 | lower rear vane carrier assembly 163 |
| FIG. 15 | blade assembly 170 |

Referring to FIGS. 1 to 15, a method of disassembling a gas turbine according to a first embodiment of the present invention aims at disassembling the entire turbine section 100. To this end, in a first embodiment of the present invention, a method of disassembling a turbine section 100 in a gas turbine may be configured to include, in sequence, a step of disassembling an upper turbine case 113, a step of disassembling a rear diffuser assembly 102 and a rear bearing assembly 103, a step of disassembling a combustor assembly 140, a step of disassembling a vane assembly 153, and a step of disassembling a blade assembly 170.

First, as shown in FIG. 2, for the disassembly of the entire turbine section 100, side flange bolts 111a and 111b are each removed from a combustor mounting portion 101 and a turbine frame 117 in the casing of the gas turbine, and vane carrier centering pins 112a and 112b are removed from vane carrier assemblies 155 and 157. The upper turbine case 113 is disassembled from the vane carrier assemblies 155 and 157 and the turbine frame 117 and the combustor mounting portion 101.

Next, as shown in FIGS. 3 to 8, the rear diffuser assembly 102 and the rear bearing assembly 103 are disassembled. First, referring to FIG. 3, a flange bolt 116a is removed from the rear diffuser 119 and a rear diffuser cover 116 is disassembled. Then, a flange bolt 115a is removed from a rear bearing housing 129 and a rear bearing housing cover 115 is disassembled. A plurality of flange bolts 116a are disposed along a circumferential direction of the rear diffuser cover 116, and the plurality of flange bolts 115a are disposed along a circumferential direction of the rear bearing housing cover 115.

Next, referring to FIG. 4, a bolt (not shown) is removed from the upper rear vane carrier assembly 157 to disassemble an upper turbine frame 118 which is integrally connected to the rear diffuser 119 and a strut (not shown). At this time, an upper thrust balance seal assembly 123 is mounted on the rear diffuser 119, and side flange bolts 121a and 121b may each be removed from the rear diffuser 119 to be disassembled from the rear diffuser 119. Here, an upper honeycomb seal 124 is disassembled from the turbine section 100 along with disassembly of the upper thrust balance seal assembly 123.

Next, referring to FIG. 5, the lower honeycomb seal 126 is removed from a lower thrust balancing seal housing 125b disposed at an opposite position of a labyrinth seal 127. Only a side end surface of the lower honeycomb seals 126 is shown in an enlarged view on FIG. 5, but the lower honeycomb seal 126 is formed in a semicircular shape and thus are disassembled by being pushed in a circumferential direction from the lower honeycomb seal mounting portion 125a.

Next, referring to FIG. 6, a bolt (not shown) is removed from a rear bearing 132, which is seated on an outer circumferential surface of a rotor shaft support 30 supporting one end part of the rotor shaft 20, so that the upper rear bearing housing 129 and an upper oil seal housing 130 are disassembled.

Next, as shown in FIG. 7, a lower knife edge seal 134 is disassembled from the lower oil seal housing 135. At this time, the lower knife edge seal 134 is formed in a semicircular shape, and thus is disassembled by being pushed in the circumferential direction from a mounting portion 135a of the lower oil seal housing 135.

Next, referring now to FIG. 8, after a bolt (not shown) is removed from the rotor shaft support 30, the upper rear bearing 132 is disassembled. At this time, the upper rear bearing 132 may be a journal bearing.

Next, the combustor assembly 140 is subjected to a disassembling step. Referring to FIG. 9, a bolt (not shown) is removed from the combustor mounting portion 101 to disassemble a combustor head assembly 141a and a liner 141b. At this time, although not shown, components such as a fuel line, an electric wire, an igniter (electronic control circuit), and a flame detector are disposed on the combustor head assembly 141a.

As shown in FIG. 10, a bolt (not shown) is removed from the upper front vane carrier assembly 155 to disassemble a transition piece 151.

Next, as shown in FIG. 11, a bolt (not shown) is removed from the upper rear vane carrier assembly 157 to disassemble the upper front vane carrier assembly 155. At this time, the upper front vane carrier assembly 155 may include first-stage to third-stage vanes 154a, 154b, and 154c, and although not shown, a U-seal is also disassembled.

Referring to FIG. 12, bolts (not shown) are removed from the lower rear vane carrier assembly 163 and a vane carrier centering pin 40a is removed from the lower turbine case 40 to disassemble a lower front vane carrier assembly 161. At this time, the lower front vane carrier assembly 161 may include first-stage to third-stage vanes 160a, 160b, and 160c, and although not shown, the U-seal is also disassembled.

Next, as shown in FIG. 13, a bolt (not shown) is removed at a contact part of the semicircular lower rear vane carrier assembly 163 and the upper rear vane carrier assembly 157 to disassemble the upper rear vane carrier assembly 157. At this time, a fourth-stage blade 165 is included on the upper rear vane carrier assembly 157, and although not shown, the U-seal is also disassembled.

Referring to FIG. 14, the vane carrier centering pin 40b is removed from the lower turbine case 40 to disassemble the lower rear vane carrier assembly 163. At this time, the lower front vane carrier assembly 163 may include a fourth-stage vane 167, and although not shown, the U-seal is also disassembled.

After the above-mentioned steps are carried out, as shown in FIG. 15, a blade fixture (not shown) is removed from a turbine disk 171, and a plurality of first-stage to fourth-stage blades 170 disposed along a circumferential direction of the turbine disk 171 are disassembled.

The maintenance or component replacement operation of the turbine section may be more efficiently performed by the disassembly process for the entire turbine section 100 as described above.

Here, the present invention relates to the gas turbine including the compressor section which compresses the air introduced from the outside, the combustor section which is connected to the compressor section and mixes the compressed air with fuel and combusts the mixture, and the turbine section which is connected to the combustor assembly and assembled in a reverse order to the disassembly method of the turbine section described above.

Table 2 relates to drawings pertaining to the second exemplary embodiment of the present invention.

TABLE 2

| Second Embodiment | |
|---|---|
| Drawing | Component(s) being disassembled and/or removed |
| FIG. 16 | upper turbine case 113 |
| FIG. 17 | combustor head assembly 141a, liner 141b |
| FIG. 18 | transition piece 151 |
| FIG. 19 | upper front vane carrier assembly 155 |
| FIG. 20 | lower front vane carrier assembly 161 |
| FIG. 21 | upper rear vane carrier assembly 157 |
| FIG. 22 | lower rear vane carrier assembly 163 |
| FIG. 23 | blade assembly 170 |

Referring to FIGS. 1 and 16 to 23, a method of disassembling a gas turbine according to a second embodiment of the present invention aims to disassemble first-stage to fourth-stage blade assemblies and first-stage to fourth-stage vane assemblies from the turbine section 100. To this end, in the second embodiment of the present invention, the method of disassembling a gas turbine may be configured to include, in sequence, a step of disassembling an upper turbine case 113, a step of disassembling a combustor assembly 140, a step of disassembling a vane assembly 153, and a step of disassembling a blade assembly 170.

First, as shown in FIG. 16, for the disassembly of the entire turbine section 100, side flange bolts 111a and 111b are each removed from a combustor mounting portion 101 and a turbine frame 117 in the casing of the gas turbine, and vane carrier centering pins 112a and 112b are removed from vane carrier assemblies 155 and 157. The upper turbine case 113 is disassembled from the vane carrier assemblies 155 and 157 and the turbine frame 117 and the combustor mounting portion 101.

Next, the combustor assembly 140 is subjected to a disassembling step. Referring to FIG. 17, a bolt (not shown) is removed from the combustor mounting portion 101 to disassemble a combustor head assembly 141a and a liner 141b. At this time, although not shown, components such as a fuel line, an electric wire, an igniter (electronic control circuit), and a flame detector are disposed on the combustor head assembly 141a.

As shown in FIG. 18, a bolt (not shown) is removed from the upper front vane carrier assembly 155 to disassemble a transition piece 151.

Next, as shown in FIG. 19, a bolt (not shown) is removed from the upper rear vane carrier assembly 157 to disassemble the upper front vane carrier assembly 155. At this time, the upper front vane carrier assembly 155 may include first-stage to third-stage vanes 154a, 154b, and 154c, and although not shown, a U-seal is also disassembled.

Referring to FIG. 20, bolts (not shown) are removed from the lower rear vane carrier assembly 163 and a vane carrier centering pin 40a is removed from the lower turbine case 40 to disassemble a lower front vane carrier assembly 161. At this time, the lower front vane carrier assembly 161 may include first-stage to third-stage vanes 160a, 160b, and 160c, and although not shown, the U-seal is also disassembled.

Next, as shown in FIG. 21, a bolt (not shown) is removed at a contact part of the semicircular lower rear vane carrier assembly 163 and the upper rear vane carrier assembly 157 to disassemble the upper rear vane carrier assembly 157. At this time, a fourth-stage blade 165 is included on the upper rear vane carrier assembly 157, and although not shown, the U-seal is also disassembled.

Referring to FIG. 22, the vane carrier centering pin 40b is removed from the lower turbine case 40 to disassemble the lower rear vane carrier assembly 163. At this time, the lower rear vane carrier assembly 163 may include a fourth-stage vane 167, and although not shown, the U-seal is also disassembled.

After the above-mentioned steps are carried out, as shown in FIG. 23, a blade fixture (not shown) is removed from a turbine disk 171, and a plurality of first-stage to fourth-stage blades 170 disposed along a circumferential direction of the turbine disk 171 are disassembled.

The maintenance or component replacement operation of the turbine section may be more efficiently performed by the disassembly process of the first-stage to fourth-stage blade assemblies and the first-stage to fourth-stage vane assemblies in the turbine section 100 as described above.

Here, the present invention relates to the gas turbine including the compressor section which compresses the air introduced from the outside, the combustor section which is connected to the compressor section and mixes the compressed air with fuel and combusts the mixture, and the turbine section which is connected to the combustor assembly and assembled in a reverse order to the disassembly method of the first-stage to fourth-stage blade assemblies and the first-stage to fourth-stage vane assemblies in the turbine section described above.

Table 3 relates to drawings pertaining to the third exemplary embodiment of the present invention.

TABLE 3

Third Embodiment

| Drawing | Component(s) being disassembled and/or removed |
|---|---|
| FIG. 24 | combustor head assembly 141a, liner 141b |
| FIG. 25 | transition piece 151 |
| FIG. 26 | inner seal carrier bolt 211 |
| FIG. 27 | first-stage vane inner fixture 212 |
| FIG. 28 | outer seal carrier bolt 213 |
| FIG. 29 | first-stage vane outer fixture 214 |
| FIG. 30 | first-stage vane 215 |
| FIG. 31 | first-stage U-ring 216 |
| FIG. 32 | first-stage ring segment fixing bolt 217 |
| FIG. 33 | first-stage ring segment fixture 218 |
| FIG. 34 | first-stage ring segment 219 |
| FIG. 35 | first-stage blade 233, first-stage blade fixture 231 |

Referring to FIGS. 1 and 24 to 35, the third embodiment of the present invention aims to efficiently disassemble a first-stage blade assembly 230 and a first-stage vane assembly 210 in a turbine section 100 from a gas turbine. To this end, a method of disassembling a gas turbine may be configured to include, in sequence, a step of disassembling a combustor assembly, a step of disassembling a first-stage vane assembly, and a step of disassembling a first-stage blade assembly.

First, referring to FIG. 24, in the disassembling of the combustor assembly, a bolt (not shown) is removed from a combustor mounting portion 101 to disassemble a combustor head assembly 141a and a liner 141b. At this time, although not shown, components such as a fuel line, an electric wire, an igniter (electronic control circuit), and a flame detector are disposed on the combustor head assembly 141a.

As shown in FIG. 25, a bolt (not shown) is removed from the upper front vane carrier assembly 155 to disassemble a transition piece 151.

FIGS. 26 to 35 are enlarged views of the area X in FIG. 1, which is a portion of the turbine section in which the first-stage blade assembly 230 and the first-stage vane assembly 210 are disposed.

Before the disassembly of the first-stage blade assembly 230, the first-stage vane assembly 210 must first be disassembled for interference avoidance. To this end, first, as shown in FIG. 26, an inner seal carrier bolt 211 for fixing a first-stage vane inner fixture 212 and a first-stage U-ring 216 to a casing support 50 is first disassembled.

Next, referring to FIG. 27, the first-stage vane inner fixture 212 is detached from the first-stage U-ring 216. With the first-stage vane inner fixture 212 thus detached, the size of the first-stage vane 215 permits its disassembly in the mounting direction of the combustor.

Next, referring to FIG. 28, an outer seal carrier bolt 213 is removed from the first-stage vane outer fixture 214 so that the first-stage vane outer fixture 214 may be disassembled from the upper front vane carrier assembly 155. As described above, the upper front vane carrier assembly 155 includes a first-stage to third-stage vanes. Among those, the first-stage vane 215 is disposed to be closest to the combustor mounting portion.

Next, referring to FIG. 29, the first-stage vane outer fixture 214 is disassembled from the upper front vane carrier assembly 155. At this time, the first-stage vane 215 is exposed in the direction of the combustor mounting portion.

Thereafter, as shown in FIG. 30, the first-stage vane 215 is disassembled from the first-stage U-ring 216 and the upper front vane carrier assembly 155 in the direction of the combustor mounting portion.

Then, as shown in FIG. 31, the first-stage U-ring 216 is disassembled from the casing support 50, to thereby create access for the disassembly of the first-stage blade assembly 230.

Next, as shown in FIG. 32, to disassemble the first-stage ring segment fixture 218 and the first-stage ring segment 219 from the upper front vane carrier assembly 155, a first-stage ring segment fixing bolt 217 is first disassembled.

Thereafter, referring to FIG. 33, the first-stage ring segment fixture 218 is disassembled from the side surface of the first-stage ring segment 219, and as shown in FIG. 34, the first-stage ring segment 219 disposed at the opposite position of the first-stage blade is disassembled in the direction of the combustor mounting portion.

Next, as shown in FIG. 35, the plurality of first-stage blade fixtures 231 disposed in the circumferential direction on the turbine disk 60 is detached, and the first-stage blade assembly 230 including the first-stage blade 233 is disassembled in the direction of the combustor mounting portion.

By the disassembly process of the first-stage vane assembly 210 and the first-stage blade assembly 230 in the turbine section 100 as described above, the maintenance or component replacement operation of the first-stage vane assembly 210 and the first-stage blade assembly 230 in the turbine section may be more efficiently performed.

Here, the present invention relates to the gas turbine including the compressor section which compresses the air introduced from the outside, the combustor section which is connected to the compressor section and mixes the compressed air with fuel and combusts the mixture, and the turbine section which is connected to the combustor assembly and assembled in a reverse order to the method of disassembling the first-stage vane assembly and the first-stage blade assembly in the turbine section described above.

Table 4 relates to drawings pertaining to the fourth exemplary embodiment of the present invention.

TABLE 4

Fourth Embodiment

| Drawing | Component(s) being disassembled and/or removed |
| --- | --- |
| FIG. 36 | diffuser loading slot 251 |
| FIG. 37 | diffuser seal loading slot 252 |
| FIG. 38 | thrust balance seal assembly loading slot 253 |
| FIG. 39 | fourth-stage blade seal ring loading slot 256 |
| FIG. 40 | fourth-stage blade assembly 240 |

Referring to FIGS. 1 and 36 to 40, the fourth embodiment of the present invention aims to efficiently disassembly a fourth-stage blade assembly 240 in a turbine section 100 from a gas turbine. To this end, the method of disassembling a gas turbine may include, in sequence, a step of disassembling a diffuser loading slot 251 and a step of disassembling a fourth-stage blade assembly 240.

FIGS. 36 to 40 are enlarged views of the area Y in FIG. 1, which is a portion of the turbine section in which the fourth-stage blade assembly 240 is disposed.

Referring to FIG. 36, to disassemble the fourth-stage blade assembly 240 from the turbine section 100, first, the diffuser loading slot 251 coupled to the diffuser seal loading slot 252 is disassembled on the rear diffuser 119.

Then, as shown in FIG. 37, the diffuser seal loading slot 252 is disassembled from the thrust balance seal assembly 123.

Next, as shown in FIG. 38, a loading slot 253 of the thrust balance seal assembly 123, on which the honeycomb chambers 253a opposite to the rotor shaft support 30 with the labyrinth seal is mounted, is disassembled. Thus, the fourth-stage blade assembly 240 is afforded space at the inward end of the fourth-stage blade assembly 240 for its disassembly in the direction of the rear diffuser 119.

Next, referring to FIG. 39, the loading slot 256 of the annularly formed fourth-stage blade seal ring is disassembled from the upper rear vane carrier assembly 157. Thus, the fourth-stage blade assembly 240 is afforded space at the outward end of the fourth-stage blade assembly 240 for its disassembly in the direction of the rear diffuser 119.

Thereafter, as shown in FIG. 40, the fourth-stage blade fixture 241 is detached from the turbine disk 70, and the fourth-stage blade assembly 240 including the fourth-stage blade 243 is disassembled in the direction of the rear diffuser 119.

As described above, the maintenance or components replacement operation of the fourth-stage blade assembly 240 in the turbine section 100 may be more efficiently performed through the disassembly process of the fourth-stage blade assembly 240 from the turbine section 100.

Here, the present invention relates to the gas turbine including the compressor section which compresses the air introduced from the outside, the combustor section which is connected to the compressor section and mixes the compressed air with fuel and combusts the mixture, and the turbine section which is connected to the combustor assembly and assembled in a reverse order to the method of disassembling a fourth-stage blade assembly from a turbine section described above.

Table 5 relates to drawings pertaining to the fifth exemplary embodiment of the present invention.

TABLE 5

Fifth Embodiment

| Drawing | Component(s) being disassembled and/or removed |
| --- | --- |
| FIG. 41 | rear diffuser cover 116, rear bearing housing cover 115 |
| FIG. 42 | rear bearing flange bolt 271 |
| FIG. 43 | rear bearing flange 272 |
| FIG. 44 | rear bearing 132 (with rotor shaft rear end support S) |

Referring to FIGS. 1 and 41 to 44, a fifth embodiment of the present invention aims to efficiently disassembly a rear bearing assembly 103 in a turbine section 100 from a gas turbine. To this end, the method of disassembling a gas turbine may be configured to include, in sequence, a step of disassembling a rear diffuser cover 116 and a step of supporting a rear end part of the rotor shaft 20 and disassembling a rear bearing assembly 103.

First, as shown in FIG. 41, a rear diffuser cover is disassembled after removal of flange bolts, and a rear bearing housing cover is disassembled after removal of flange bolts. That is, a side flange bolt 116a is removed from a rear diffuser 119 to disassemble a rear diffuser cover 116. Then, a side flange bolt 115a is removed from a rear bearing housing 129 to disassemble a rear bearing housing cover 115. Here, the flange bolt 116a consists of a plurality of flange bolts arranged around the circumference of the rear diffuser cover 116, and the flange bolt 115a consists of a plurality of flange bolts arranged around the circumference of the rear bearing housing cover 115.

FIGS. 42 to 44 are enlarged views of the area Z in FIG. 1, which is a portion of the turbine section in which the rear bearing assembly 103 is disposed.

First, referring to FIG. 42, to disassemble a rear bearing flange 272 fixing the rear bearing 132, a rear bearing flange bolt 271 is disassembled from the rear bearing housing 129.

As shown in FIG. 43, the annular rear bearing flange 272, which brings the rear bearing housing 129 into contact with the rear bearing 132 and fixes the rear bearing housing 129 and the rear bearing 132, is disassembled.

Referring to FIG. 44, one end part of the rotor shaft 20 is supported by a support beam S and the rear bearing 132 is disassembled from the rotor shaft support 30, thereby completing the disassembly of the rear bearing 132.

As described above, it is possible to more efficiently perform the maintenance or components replacement operation of the rear bearing assembly 103 in the turbine section 100 by the process of disassembling the rear bearing assembly 103 from the turbine section 100.

Here, the present invention relates to the gas turbine including the compressor section which compresses the air introduced from the outside, the combustor section which is connected to the compressor section and mixes the compressed air with fuel and combusts the mixture, and the turbine section which is connected to the combustor assembly and assembled in a reverse order to the method of disassembling a rear bearing from a turbine section described above.

As described above in accordance with the present invention, various methods of disassembling and assembling a turbine section can be utilized in response to a situation where a worker intends to disassemble and reassemble the turbine section or to maintain the specific components in the turbine section, thereby improving the work efficiency related to the disassembly, assembly, or maintenance and reducing time and cost.

The above description describes only a specific embodiment of the method of disassembling and assembling a gas turbine and the gas turbine assembled thereby. Therefore, it is to be noted that the present invention may be variously substituted and modified by those skilled in the art without departing from the spirit of the present invention as disclosed in the accompanying claims.

What is claimed is:

1. A method of disassembling a turbine section from a gas turbine, the method comprising sequential steps of:
   (a) disassembling an upper turbine case;
   (b) disassembling a rear diffuser assembly and a rear bearing assembly by sequential steps of:
      (b1) disassembling a rear diffuser cover of the rear diffuser assembly from a rear diffuser of the rear diffuser assembly;
      (b2) disassembling a rear bearing housing cover of the rear bearing assembly from a rear bearing housing of the rear bearing assembly;
      (b3) disassembling an upper turbine frame, which is connected to an upper rear diffuser of the rear diffuser, from an upper rear vane carrier assembly;
      (b4) disassembling an upper thrust balance seal and an upper honeycomb seal from the rear diffuser; and
      (b5) disassembling a lower honeycomb seal from a lower thrust balance seal assembly;
   (c) disassembling a combustor assembly from a vane assembly;
   (d) disassembling the vane assembly; and
   (e) disassembling a blade assembly.

2. The method of claim 1,
   wherein the upper thrust balance seal and the upper honeycomb seal are disassembled from the rear diffuser by removing a pair of side flange bolts from the rear diffuser, and
   wherein the lower honeycomb seal is disassembled from the lower thrust balance seal assembly by pushing the lower honeycomb seal in a circumferential direction from a lower honeycomb seal mounting portion of the lower thrust balance seal assembly.

3. The method of claim 2, wherein, after the step (b5), the step (b) further includes:
   (b6) disassembling an upper rear bearing housing and an upper oil seal housing from a rear bearing of the rear bearing assembly.

4. The method of claim 3, wherein, after the step (b6), the step (b) further includes sequential steps of:
   (b7) disassembling a lower knife edge seal from a lower oil seal housing; and
   (b8) disassembling an upper rear bearing from a rotor shaft support.

5. The method of claim 1, wherein the step (c) includes sequential steps of:
   (c1) disassembling a combustor head assembly and a liner from a combustor mounting portion; and
   (c2) disassembling a transition piece from an upper front vane carrier assembly of the vane assembly.

6. The method of claim 1, wherein the step (d) includes sequential steps of:
   (d1) disassembling an upper front vane carrier assembly from an upper rear vane carrier assembly; and
   (d2) disassembling a lower front vane carrier assembly from a lower rear vane carrier assembly and a lower turbine case.

7. The method of claim 6, wherein each of the steps (d1) and (d2) includes:
   (d1a, d2a) disassembling first-stage to third-stage vanes.

8. The method of claim 7, wherein the step (d) further includes sequential steps of:
   (d3) disassembling the upper rear vane carrier assembly by separating a contact part from the lower rear vane carrier assembly; and
   (d4) disassembling the lower rear vane carrier assembly from the lower turbine case.

9. The method of claim 8, wherein each of the steps (d3) and (d4) includes:
   (d3a, d4a) disassembling a fourth-stage vane.

10. The method of claim 1, wherein the step (e) includes:
    (e1) disassembling first-stage to fourth-stage blades.

11. A gas turbine, comprising:
    a compressor section configured to compress air introduced from outside the gas turbine;
    a combustor section including a combustor assembly, the combustor section configured to be connected to the compressor section and mix the compressed air with fuel and combust the mixture; and
    the turbine section configured to be connected to the combustor assembly of the combustor section and assembled in a reverse order with respect to the sequential steps (a) through (e) of the disassembly method of claim 1.

* * * * *